(12) United States Patent
Iwase et al.

(10) Patent No.: US 6,660,196 B1
(45) Date of Patent: Dec. 9, 2003

(54) METHOD FOR PRODUCING AN INJECTION MOLDED PRODUCT WITH A GRAINED PATTERN

(75) Inventors: Kenju Iwase, Yashio (JP); Takeshi Kadoki, Yashio (JP)

(73) Assignee: Naka Kogyo Co., Ltd., Tokyo (JP)

( * ) Notice: Subject to any disclaimer, the term of this patent is extended or adjusted under 35 U.S.C. 154(b) by 0 days.

(21) Appl. No.: 09/701,616

(22) PCT Filed: Jun. 2, 1999

(86) PCT No.: PCT/JP99/02942
§ 371 (c)(1),
(2), (4) Date: Feb. 26, 2001

(87) PCT Pub. No.: WO99/62687
PCT Pub. Date: Dec. 9, 1999

(30) Foreign Application Priority Data

Jun. 3, 1998 (JP) ............................................ 10-170618
Jun. 3, 1998 (JP) ............................................ 10-170619

(51) Int. Cl.[7] .............................................. B29C 45/16
(52) U.S. Cl. .................... 264/73; 264/245; 264/255; 264/328.18; 264/328.12
(58) Field of Search ................................ 264/245, 246, 264/247, 73, 75, 328.1, 328.8, 328.12, 328.18, 255; 425/129.1, 130

(56) References Cited

U.S. PATENT DOCUMENTS

| | | | | |
|---|---|---|---|---|
| 2,485,323 A | * | 10/1949 | Schwartz | 264/245 |
| 3,608,013 A | * | 9/1971 | Ingham | 264/70 |
| 3,884,605 A | * | 5/1975 | Grelon | 425/131.1 |
| 5,094,788 A | * | 3/1992 | Schrenk et al. | 264/173.15 |
| 5,264,172 A | * | 11/1993 | Rosica et al. | 264/132 |
| 5,512,226 A | * | 4/1996 | Rosica et al. | 264/132 |
| 5,628,950 A | * | 5/1997 | Schrenk et al. | 264/241 |
| 5,736,084 A | * | 4/1998 | Uchida et al. | 264/112 |
| 5,820,799 A | * | 10/1998 | Barnett | 264/73 |

* cited by examiner

Primary Examiner—Angela Ortiz
(74) Attorney, Agent, or Firm—Morrison & Foerster LLP

(57) ABSTRACT

An injection molded product is provided on its surface with a fine grain-like pattern resembling a grain pattern of a natural wooden material. The fine grain-like pattern of the injection molded product 1 (a product part 2) is formed from a molten resin 15 comprising a first material 24 and a second material 25 having a different color, mixed in a substantially separate manner, by feeding the molten resin into a cavity 18 for molding the injection molded product in a form of plural divided streams 26 each having a generally constant width so as to allow the second material to solidify as a trace of each divided streams 26.

16 Claims, 29 Drawing Sheets

METHOD FOR PRODUCING AN INJECTION MOLDED PRODUCT WITH A GRAINED PATTERN

TECHNICAL FIELD

The present invention relates to a grained injection molded product, a method and a device for producing a grained injection molded product.

BACKGROUND TECHNOLOGY

A method for the preparation of a grained injection molded product, i.e., an injection molded product with a grain-like pattern on the surface of the product from a synthetic resin is disclosed, for example, in Japanese Patent Application Laid-Open No. 8-276,464. This disclosed method is adaptable to the large-scale preparation of injection molded products from synthetic resin, which are provided with a grain-like pattern resembling a grain of a natural wood product.

This disclosed method can provide an injection molded product with a grain-like pattern on its surface; however, it cannot form a pattern of high quality such as a fine grain-like pattern.

Therefore, the present invention has the primary object to provide a grained injection molded product with a fine grain-like pattern remarkably resembling a wooden product with a natural grain pattern.

The present invention has another object to provide a method for the preparation of an injection molded product with such a grain-like pattern resembling a grain of a natural wooden product.

The present invention has a further object to provide a device for use in the preparation of an injection molded product with a grain-like pattern resembling a grain of a natural wooden product.

DISCLOSURE OF THE INVENTION

In order to achieve the first object as described above, the present invention provides a grained injection molded product on at least a surface of the injection molded product from a molten resin being composed of a first material and a second material having a color different from the color of the first material and combined in an incompletely mixed state, that is, in a substantially separately mixed state such that the first material and the second material are not completely mixed and separately combined so as to visibly distinguish the colors of the two materials from each other, the injection-molded product prepared by feeding the molten resin as in the form of divided streams into a cavity, elongating the divided streams into a desired shape of a product, and allowing the divided streams to solidify with traces of the divided streams in the form of a grain-like pattern retained on the surface of the product; wherein each of the divided streams is allowed to solidify into a solidification layer comprising a first solidification layer section and a second solidification layer section, the first solidification layer section being composed substantially of the first material and extending in a direction of elongation of the divided stream on the inside thereof and the second solidification layer section being composed substantially of the second material and extending in a direction of elongation of the divided stream on both sides thereof.

In order to further achieve the primary object, the present invention provides an injection molded product with a grain-like pattern on at least a surface of the injection molded product, prepared by feeding a molten resin composed of a mixture of a first material and a second material having a color different from that of the first material, combined in a substantially separately mixed manner, in the form of plural divided streams to a cavity, elongating the plural divided streams into the product, and allowing the plural divided streams to solidify with traces of the divided streams in the form of a grain-like pattern retained on at least the surface of the product; wherein the molten resin is allowed to solidify into a solidification layer with the trace of the divided stream retained thereon and a reinforcement member is disposed inside the solidification layer for supporting for the solidification layer; and wherein the solidification layer of each divided stream comprises a first solidification layer section and a second solidification layer section, the first solidification layer section being composed substantially of the first material and extending in a direction of elongation of the divided stream on the inside thereof and the second solidification layer section being composed substantially of the second material and extending in a direction of elongation of the divided stream on both sides thereof.

In order to achieve the second object, the present invention provides a method for the preparation of an injection molded product with a grain-like pattern, which comprises feeding a molten resin composed of a first material and a second material having a color different from that of the first material to a cavity resin feed end of a cavity, the molten resin being a mixture of the first and second materials in a substantially separately mixed manner; and feeding the molten resin into the cavity from the cavity resin feed end thereof as in the form of a plurality of divided streams.

In order to further achieve the second object, the present invention provides a method for the preparation of an injection molded product with a grain-like pattern, which comprises feeding a molten resin to a cavity resin feed end of a cavity with a reinforcement member set at a site corresponding to the inside of the injection molded product, the molten resin being composed of a first material and a second material having a color different from that of the second material and combined in a substantially separate manner; and feeding the molten resin from the cavity resin feed end thereof into a space of the cavity between the reinforcement member and a wall surface of the cavity in the form of a plurality of divided streams.

In order to achieve the third object, the present invention provides a device for use in the preparation of an injection molded product with a grain-like pattern, wherein a gate is disposed at the cavity resin feed end of the cavity; and the gate is arranged so as to flow the molten resin into the cavity in the form of plural divided streams in a parallel arrangement.

In order to further achieve the third object, the present invention provides a device for use in the preparation of an injection molded product with a grain-like pattern, wherein the reinforcement member is set at a site of the cavity corresponding to the inside of the injection molded product; and a plurality of gates are arranged sideways in a space between the reinforcement member and a wall surface of the cavity so as to flow the molten resin in the form of a plurality of divided streams into the cavity resin feed end of the cavity.

For the invention in the aspect, the molten resin composed of the first material and the second material having a color different from that of the first material and combined in a substantially separate manner is fed to the cavity in the form of a plurality of divided streams, and each of the divided streams composed of the second material enters into the cavity in a parabolic form by taking advantage of the flow characteristics of the plural divided stream and then disperses in a widthwise or transverse direction, i.e., toward the inside of the divided stream, while flowing toward the cavity resin reach end of the cavity. The widthwise extension of the end portion of the divided stream is restricted by the function that each of the adjacent divided streams acts as a sort of a wall of the divided stream, in association with the action that the end portion of the divided stream flows toward the cavity resin feed end thereof. However, while the widthwise extension of the divided stream of the first material is being restricted, the divided stream composed of the first and second materials is extended in a direction of elongation thereof and allowed to solidify with the trace of the divided stream retained thereon into a solidification layer, when solidified, that comprises a first solidification layer section and a second solidification layer section, the first solidification layer section being composed substantially of the first material and extending in a direction of elongation of the divided stream thereof on the inside thereof and the second solidification layer section being composed substantially of the second material and extending in a direction of elongation of the divided stream on both sides thereof. As the plural divided streams are solidified, the traces of the divided streams are left retaining a grain-like pattern having a generally constant width between all the adjacent lines on the surface. The injection molded product of the invention can form a fine grain-like pattern resembling a grain on a natural wooden material.

On the other hand, the second material of each divided stream has a transverse extension of the width thereof regulated from extending transversely, that is, on the inside of the divided stream, by the adjacent divided streams immediately after entry into the cavity, forming a linear pattern having a generally constant width, thereby forming a fine grain-like pattern resembling a grain of a naturally wooden material, whether the full length of the divided stream is longer or shorter.

Further, for the injection molded product with a grain-like pattern according to the present invention, a linear pattern can be formed depending upon a number of divided streams because a pattern with two lines is formed for every one divided stream. Therefore, the number of the lines of the linear pattern can be increased or decreased by adjustment of the number of the divided streams, so that a variety of fine grain-like patterns can be created in an optional manner.

Moreover, as a fine grain-like pattern can be formed following traces of the corresponding divided streams, such a fine grain-like pattern can be created on an injection molded product of a variety of shapes, such as an elbow-like shape or a cap-like shape, simply by setting the number of the divided streams upon molding. Therefore, the injection molded products can be manufactured at cheap costs, which are equal in quality to natural wooden products.

In addition, as the fine grain-like pattern is formed on the basis of the traces of the divided streams, the divided stream of the second material can create a linear pattern having a generally constant width within the inside as well as on the surface of the molded product on the basis of the action of the divided streams upon molding, so that the grain-like pattern of the injection molded product fails to disappear even if the injection molded product would wear off. Therefore, the injection molded product with the fine grain-like pattern increases reliability for a fine grain-like pattern as well as provides a fine grain-like pattern resembling a grain of a naturally wooden material. Moreover, the injection molded product can well compete with wearing off and abrasion.

A preferred aspect of the present invention can set to render thickness of the divided stream thicker at a site where the flow distance of each trace of the divided stream becomes longer in the direction of elongation of the trace thereof than the rest, so that a resistance to flow of the divided streams can be rendered smaller at the portion where the thickness is thicker at the stage of manufacturing the injection molded products with a fine grain-like pattern. Therefore, each divided stream can reach the cavity resin feed end of the cavity at a substantially equal timing, while suppressing the confusion of the divided stream section of the first material with the divided stream section of the second material, that is, while enhancing the directional properties of the divided streams and suppressing turbulence of the directional properties of the divided stream in resistance to the force on the basis of the other divided streams. This function can control the turbulence of an ordered arrangement of the divided streams, upon manufacturing, even in the case where the injection molded product is provided with a curved portion (that is, where the flow distances of the divided streams differ from one another at different portions), such a turbulence being caused by flowing the divided stream that has reached the cavity resin reach end of the cavity at a faster timing into a flowing region of the divided stream that yet reaches the cavity resin reach end thereof, on the basis of the great difference in the reaching timing. After the divided streams are allowed to solidify, a linear pattern (a fine grain-like pattern resembling a grain on a natural wooden material) having a generally constant width can be formed over the entire length of the injection molded product.

In accordance with the present invention, a depressed portion or a raised portion is provided on the inside surface of the cavity along the trace of the divided stream, and the depressed portion or the raised portion can function as a guide means that may vary a space for the thickness of the cavity at the stage of manufacturing the injection molded product with a fine grain-like pattern. This guide function can sustain a flow of the divided streams with appropriate directional properties and suppress the turbulence of an ordered arrangement of the divided streams, even if the cavity is provided with a curved portion and the flow distance of the divided streams is different from the rest. Moreover, the enhanced directional properties can assist in sustaining an ordered arrangement among the divided streams because each divided stream can resist the force that may cause disturbing the directional properties of the divided streams, even if such force would act thereon. Therefore, the characteristics of each divided stream can be utilized for sure, so that a linear pattern with a generally constant width can be created for each divided stream, even in the case where the injection molded product would have a curved portion (where the flow distance of the divided streams is different), and the formation of a fine grain-like pattern resembling a grain of a natural wooden material can be ensured.

In a preferred aspect of the present invention, the first material or the second material contains wooden powder, so that the injection molded product can provide a wood-like touch or feel like a natural wood material, as well as a natural wood-like appearance on the surface thereof. Furthermore, the injection molded product can have a specific heat as a wooden material has. These properties can further provide an improved natural wood-like quality for the injection molded product of this invention.

A preferred aspect of the present invention can provide the injection molded product in the form of a flat plate with a plurality of traces of the plural divided streams formed inside it as well as on its surface as in the form of a grain-like pattern in the direction of elongation of the divide streams. Therefore, the injection molded product has a fine grain-like pattern on the surface and inside thereof, which follows the traces of the divided streams, so that the cut surface of the molded product also has a fine grain-like pattern.

The present invention in a preferred aspect provides a cylindrical body with bottom having a ceiling part and a peripheral side wall part extending at a right angle from the peripheral edge section of the ceiling part, which is formed with traces of plural divided streams extending longitudinally from a portion of the peripheral side wall part on a one side of the cylindrical body to the other portion of the peripheral side wall part on the opposite side thereof. Therefore, even if the injection molded product would be such a cylindrical body with bottom, a fine grain-like pattern can be formed on the surface of the peripheral side wall thereof on the basis of the traces of the plural divided streams which extend longitudinally from a portion of the peripheral side wall part on a one side thereof via the ceiling part to the other portion of the peripheral side wall part on the opposite side thereof. This provides the surface of the ceiling part with a favored outlook as shown on a surface of a cut section of a natural wood with a fine grain.

Further, a preferred aspect of the present invention also provides a cylindrical member having an L-shaped curved portion, which is formed with traces of plural divided streams on the peripheral surface thereof extending along and parallel to the axis of the cylindrical body. Even if the injection molded product would be a product with a curved section such as an L-shaped section as in this aspect, the L-shaped molded product is provided on its entire surface area with a fine grain-like pattern that follows the traces of the plural divided streams extending along and parallel to the axis thereof, as if it would be formed by bending a natural wood material by laborious processing means.

In another aspect of the present invention, there is used a molten resin which is composed of the first material and the second material having a color different from that of the second material and which has the first material and the second material combined in a substantially separate state, and the molten resin is fed into the cavity as plural divided streams and allowed to solidify on a reinforcement member. In this aspect, the divided stream section composed mainly of the second material enters into the cavity in a parabolic form, together with the divided stream section of the first material, and then disperses in the widthwise direction of the partial section, while the top of each divided stream is elongating toward the cavity resin reach end of the cavity, on the basis of the flow characteristics of the divided stream. As the divided stream of the second material is flowing in the widthwise direction, the movement of the divided stream of the second material is regulated by a widthwise and forward movement of the divided stream of the first material that is flowing adjacent the divided stream of the second material. The divided stream is then allowed to solidify into a solidification layer leaving traces of the divided streams thereon, which comprises a first solidification layer section and a second solidification layer section, the first solidification layer section leaving the trace of the divided stream of the first material and extending along and in the direction of elongation of each divided stream on the inside thereof and the second solidification layer section leaving the traces of the divided streams of the second material and extending in the direction of elongation of the divided stream on the both sides thereof. A combination of the traces of the plural divided streams provides a linear pattern having a generally constant width, and the injection molded product is formed with a fine grain-like pattern on the surface thereof, which resembles a grain on a natural wooden material.

In this aspect of the invention, each divided stream of the second material is regulated so as to fail to disperse in the widthwise or transverse direction thereof by the adjacent divided streams of the first material, as it enters the cavity. This permits the formation of a linear pattern having a generally constant width, so that a fine grain-like pattern such as a grain-like pattern remarkably resembling a fine grain of a natural wood material can be formed over the entire surface of the molded product, whether the full length of the divided stream is longer or shorter.

Moreover, a linear pattern for the injection molded product according to the present invention may be formed depending upon the number of the divided streams and a pattern composed of two lines is formed for each divided stream. Therefore, the number of lines for the linear pattern can be adjusted with high freedom to form a variety of fine grain-like patterns, simply by changing the number of the divided streams.

In addition, a fine grain-like pattern is formed mainly on the basis of the traces of the plural divided streams, so that a variety of grain-like patterns can be formed on various shapes of molded products, for example, an elbow-like shape or a cap shape, simply by setting the divided streams so as to comply with such requirements, upon molding. Therefore, the injection molded products with a fine grain-like pattern of quality as high as natural wooden products can be produced at cheaper costs.

Furthermore, this aspect of the present invention can form a fine grain-like pattern on the basis of the traces of the divided streams, so that a linear pattern with a generally constant width can be formed inside as well as on the surface the injection molded product by the action of the divided streams upon molding, which follows the traces of the divided streams composed mainly of the second material. Therefore, the injection molded product with such a grain-like pattern can sustain its pattern over the entire thickness thereof as well as on the surface thereof, even if it would be worn away, so that the injection molded product can provide improved reliability as the injection molded product with a fine grain-like pattern. At the same time, the injection molded product can provide a fine grain-like pattern that remarkably resembles a grain on a natural wooden material and also sustains resistance to wearing off or abrasion.

In this aspect of the present invention, too, the space of the cavity corresponding substantially to the thickness of the product can be readily rendered narrower by means of the reinforcement member in order to increase a speed of flowing the divided streams under conditions of a constant injection pressure at the stage of manufacturing processes, so that a more clearly fine grain-like pattern on the basis of the traces of the divided streams can be formed. On the other hand, the reinforcement member can supplement the narrowed portion of the solidification layer to ensure a sufficient level of physical strength.

Moreover, the molten resin consisting of the first material and the second material of different kinds are allowed to solidify in a substantially separately blended state, i.e., in a substantially state such that the two materials exist in a substantially separate state o as to visibly distinguish the two materials from each other. Therefore, the solidification layer might become lower in physical strength as compared with the mixture where the two materials are mixed together completely; however, in this case, the reinforcement member can supplement the decreased strength of the solidification layer, thereby ensuring a sufficient level of strength as an injection molded product.

In a preferred aspect of the present invention, the reinforcement member is disposed so as to laminate the solidification layer so as to cover the entire area of the inner side thereof, and the thickness of the solidification layer can be rendered thicker at a portion where the length of the trace of the divided stream becomes longer in the direction of elongation of the divided stream than at a portion where the length of the trace of the divided stream becomes shorter. Therefore, even if the molded product is provided with a curved section (that is, the flow distances of the divided streams are different for one another), the resistance to flow of the divided stream can be rendered lower at the thicker portion of the solidification layer by adjusting the thickness of the reinforcement member, at the stage of manufacturing the injection molded product with a grain-like pattern so as to allow all the divided streams to reach the cavity resin reach end of the cavity at a substantially equal timing. At the same time, the directional properties of the divided streams can be enhanced, and the disturbance of the directional properties thereof can be suppressed in resistance to the forces on the basis of the other divided streams, thereby sustaining an ordered arrangement of the divided streams. Therefore, even in the case where the injection molded product is provided with a curved section where the flow distances of the divided streams are different, the disturbance of an ordered arrangement of the divided streams can be suppressed, which may be caused by the entry of the divided streams reaching the cavity resin reach end of the cavity on the great difference in timing to reach the cavity resin reach end thereof into a flowing region of the divided streams that do not yet reach the cavity resin reach end thereof. Therefore, a linear pattern having a generally constant width, which remarkably resembles a fine grain pattern on a natural wooden material, can be formed on the solidification layer over the entire length of the traces of the divided streams.

On the other hand, in this aspect of the present invention, although the thickness of the solidification becomes irregular, the reinforcement member corrects the irregular thickness to a constant thickness or a designed thickness as required by the molded product.

A preferred aspect of the present invention is configured such that the reinforcement member is disposed so as to laminate so as to cover the substantially entire inner surface area of the solidification layer and it is provided with a guide groove along the traces of the divided streams opposite to the solidification layer in such a manner that the solidification layer extends into the guide groove. This configuration of the guide groove can provide the flow of each divided stream with appropriately enhanced directional properties on the basis of the guide function of the guide groove, while suppressing the directional properties of each divided stream at the stage of manufacturing the injection molded product, even if the cavity would be provided with a curved section and the flow distances of the divided streams would be different at different portions. Moreover, the enhanced directional properties of the divided streams can assist in sustaining an ordered arrangement of the divided streams and resist the force to disturb the directional properties of the divided streams would act on the divided streams, even if the force would act on the divided streams. Therefore, the action of each divided stream can be utilized in a definite way and, even in the case where the injection molded product is provided with a curved section, i.e., where the flow distances of the divided streams are different at different portions, a linear pattern with a generally constant width can be definitely formed for each divided stream, thereby providing a fine grain-like pattern resembling a natural grain pattern.

Further, the inner side surface of the solidification layer becomes raised or depressed by the provision of the guide grooves. The thickness at the raised and depressed surface of the solidification layer, however, can be rendered constant by the lamination of the reinforcement member by adjusting the thickness of the reinforcement member or the inner surface of the solidification layer by the solidification layer. The provision of the reinforcement member can render the inner surface of the injection molded product flat and the thickness of the injection molded product constant, thereby achieving improved maneuverability and favorable appearance.

In addition, the guide grooves can increase the area of attachment of the solidification layer to the reinforcement member, thereby assisting in enhancing the strength of attachment between the two elements.

In a preferred aspect of the present invention, a plurality of the guide grooves are disposed so as to agree with an arrangement of the traces of divided streams and the plural guide grooves are set to become deeper at a site where the distance of each divided stream trace becomes longer in the direction of elongation of the divided stream, thereby enabling the effects to be achieved.

A preferred aspect of the present invention uses the first material or the second material, which may contain wooden powder. This feature can provide a visible appearance for the injection molded product, which resembles a natural wooden material with a grain. Further, this can assist in ensuring a touch and specific heat for the injection molded product as if it is like a wooden material, so that a wood-like feeling of the injection molded product can be improved.

In this aspect, too, the reinforcement member can supplement and reinforce the strength of the solidification layer to a sufficient extent due to a possible decrease in the strength by the addition of wooden powder. Further, this feature allows an increase in a rate of the wooden powder, so that a wood-like quality of the injection molded product can be improved.

The present invention in a preferred aspect provides the injection molded product with a fine grain-like pattern, wherein the solidification layer is in the form of a flat plate and the divided stream traces are formed in the direction of elongation of the solidification layer. Therefore, the thickness of the injection molded product can be set to become as predetermined on the basis of the functions of the reinforcement member for reinforcement and adjustments of the thickness, and the inner surface of the solidification layer. This can also render the inner surface of the injection molded product flat, while ensuring the sufficient level of strength, favorable maneuverability and better appearance, and form a fine grain-like pattern on the surface of the injection molded product in the flat plate form and inside it (within the solidification layer), on the basis of the traces of the plural divided streams.

In a preferred aspect of the present invention, the injection molded product is in the form of a cylindrical body with bottom, wherein the solidification layer comprises a ceiling part and a peripheral side wall part extending at a right angle from the peripheral edge of the ceiling part and wherein the traces of the plural divided streams are created extending longitudinally from a portion of the peripheral side wall part on the one side of the cylindrical body to a portion of the peripheral side wall part on the other side thereof opposite to the one side thereof. The cylindrical body of this aspect of the invention can ensure a sufficient degree of strength, favorable maneuverability and better appearance by the provision of the reinforcement member. Furthermore, the injection molded product is provided with a fine grain-like pattern following the traces of the plural divided streams of the second material extending longitudinally from a portion of the peripheral side wall part on the one side of the cylindrical body via the ceiling part to a portion of the peripheral side wall part on the other side thereof opposite to the one side thereof. Moreover, the surface of the ceiling part can be shown to have a fine grain-like pattern formed on the basis of the plural divided stream traces, as if it is a cut section of a fine grain of a natural wooden material.

A preferred aspect of the present invention provides a cylindrical body with the solidification layer formed in a generally L-shaped form, wherein the traces of the plural divided streams are formed, extending along and parallel to the axis of the cylindrical body. Therefore, the injection molded product can be formed having a desired degree of strength and thickness on the basis of the functions of the reinforcement member for reinforcement, adjustment of thickness, and adjustment of the inner surface of the injection molded product. Moreover, this aspect of the present invention can render the inner surface (the inner peripheral face) of the injection molded product flat, while ensuring the desired level of strength, favorable maneuverability, and better appearance. In addition, in the case where the cylindrical body as the injection molded product is provided with a curved section such as a L-shaped curved section as in this embodiment, an ordered arrangement of a fine grain-like pattern can be formed on such a curved section as well as the peripheral surface along and parallel to the axis of the cylindrical body on the basis of the traces of the plural divided streams. Furthermore, the fine grain-like pattern of the injection molded product resembles a grain pattern on a natural wooden material prepared by laborious and complicated processing.

In a preferred aspect of the present invention, the reinforcement member is made of synthetic resin so that the reinforcement member can be better adapted to the solidification layer and it can be integrally joined together with the solidification layer. Further, if the color of the reinforcement member is the same as that of the solidification layer, they can be recognized as an integral thing.

Moreover, this aspect of the present invention can optionally form the injection molded product having an optional inside shape without disturbing the ordered formation of a grain-like pattern on the solidification layer, so that there can readily be produced projection elements or other parts for engagement or for use in accordance with partner elements for mounting or reinforcement ribs and so on for enhancement of strength.

A further aspect of the present invention provides a method for the preparation of the injection molded product with a grain-like pattern, wherein the molten resin composed of the first material and the second material having a color different from that of the first material and admixed in a substantially separate state is fed to the cavity resin feed end of the cavity. The second material is fed one after another as plural divided streams to the cavity resin feed end of the cavity, creating a shape of a flow extending along the cavity resin feed end thereof. Thereafter, the molten resin is fed from the cavity resin feed end into the cavity as a plurality of divided streams. In this instance, the second material of the molten resin undergoes the force (the injection pressure) of flowing in the direction crossing at a right angle to the cavity resin feed end thereof at the portion where each divided stream is created and each divided stream enters into the cavity in a parabolic form. Once each divided stream enters into the cavity, the top edge of each divided stream flows toward the cavity resin reach end of the cavity and begins spreading in the widthwise direction of each divided stream, while elongating along and parallel to the direction of elongation of the divided stream. The widthwise extension of the divided stream of the second material, however, is regulated by the action of the adjacent divided streams, and the divided stream of the second material is caused to elongate in the direction along and parallel to the direction of elongation of the divided stream while the divided stream of the second material is being suppressed from expanding in the widthwise or transverse direction of the divided stream. In particular, as each divided stream has a greater speed gradient on both sides than on the inside of the divided stream, the divided stream of the second material (forming a linear pattern) on the both sides of each divided stream of the first material is elongated to a divided stream having a narrower width by the shear force in the flow direction of the divided stream, and the linear pattern can be rendered gradually narrower as the divided stream is elongated longer. This can provide the injection molded product with a linear pattern having a generally constant width, which follows the divided stream traces, resembling a grain pattern on the surface of a natural wooden material.

Further, each divided stream of the second material is regulated immediately from the start of entry into the cavity resin feed end of the cavity by the adjacent divided streams of the first and second materials so as to fail to expand in a widthwise or transverse direction of each divided stream, so that a linear pattern with a generally constant width can be formed in the direction of elongation of each divided stream. This fine grain-like pattern resembling a grain on a natural wooden material can be formed on the surface of the injection molded product, whether it is longer or shorter.

Moreover, the pattern of the second material may depend mainly upon the number of divided streams because a pattern of two lines is formed for each divided stream, so that increasing or decreasing the number of divided streams can adjust the number of linear patterns. Therefore, a variety of fine grain-like patterns can optionally be formed on the surface of the injection molded product simply by adjusting the number of the divided streams.

Furthermore, the fine grain-like pattern is formed on the surface of the injection molded product on the basis of the divided streams, so that it can be formed over the entire surface area (the entire periphery) of the injection molded product simply by setting the divided streams for a moldable product of various shapes such as an elbow-like shape or a cap shape.

In addition, the fine grain-like pattern can be formed on the basis of the divided streams in a regular manner, so that the quality of the injection molded product (the state of the fine grain-like pattern formed) can be rendered uniform and raise a yield of the injection molded products.

This aspect of the present invention also provides the method for the preparation of the injection molded product with a grain-like pattern, which uses the molten resin comprising the first material and the second material having a different color in a substantially separately mixed state and feeds the molten resin to the cavity resin feed end of the cavity. This method in this aspect of the present invention utilizes the flow of the divided streams to create a flowing shape of the divided stream in front of the cavity resin feed end thereof, which then flows in the direction of elongation of the divided stream along the cavity resin feed end thereof by using any appropriate molding machine capable of feeding the molten resin into the cavity. Such a molding machine may include, for example, a screw-type injection molding machine, a plunger-type injection molding machine, a one-head injection molding machine or a multi-head injection molding machine. This method for the preparation of the injection molded product can reduce costs of plant and equipment because such a general-purpose molding machine can be used.

For the method in a preferred aspect of the present invention as described in claim 18, the divided streams can be fed into the cavity at substantially the same timing, so that the extension of each divided stream of the second material in the widthwise direction of the divided stream can be regulated immediately after the entry into the cavity to form a linear pattern having a generally constant width for each divided stream. The formation of the linear patterns by the divided streams of the second material utilizes the action of the adjacent divided streams of the first material, like a sort of the action functioning as a wall for regulating the flow of the divided stream of the second material immediately after the creation of the divided stream (immediately after the entry of the molten resin into the cavity). This can create a fine grain-like pattern resembling a grain on a natural wooden material, whether the size of the product is longer or shorter.

In a preferred aspect of the present invention, the plural divided streams are formed by the plural gates arranged sideways along the cavity resin feed end of the cavity, so that the plural divided streams can be created by the simplified process and device configurations with certainty and readiness.

Further, the method in a preferred aspect of the present invention can create a balanced mode of the flow of the divided streams over the entire range from the cavity resin feed end of the cavity to the cavity resin reach end thereof by regulating the movement of each of the divided streams having different magnitudes of the flow force injected from the plural gates (by means of a resistance to shear) by using a film gate communicating with each gate, which is disposed adjacent the gates, in association with the plural gates. Therefore, a linear pattern of each divided stream having a generally constant width can be sustained over the entire width, and the injection molded product with a grain-like pattern can be formed resembling a grain of a natural wooden material without causing any variation in the width of the linear pattern.

The method in a preferred aspect of the present invention can feed the divided streams into the cavity at substantially the same timing by adjusting the timing of feeding the divided streams on the basis of the resistance of the gates by rendering the gate size smaller for the gate that feeds the divided stream at a faster timing than the gate that feeds it at a slower timing. Therefore, a linear pattern with a generally constant width can be created surely for each divided stream, and the injection molded product with a fine grain-like pattern resembling a fine grain on a natural wooden material can be produced, whether it is longer or shorter.

In a preferred aspect of the present invention, an opening valve is disposed at the cavity resin feed end of the cavity, and the valve is opened as the portion in front of the cavity resin feed end thereof is filled with the molten resin. As the valve is opened, the molten resin is fed in the form of divided streams into the cavity at substantially the same timings. In this case, too, a linear pattern having a generally constant width can be certainly created for each divided stream, and utilizing the flow characteristics of each divided stream can produce the injection molded product with such a grain-like pattern resembling a fine grain on a naturally wooden material, whether it is longer or shorter.

The method in a preferred aspect of the present invention can sustain the flow of each divided stream with appropriate directional properties and suppress the disturbance of the directional properties of each divided stream by means of a guide means for guiding each divided stream, which may comprise a depressed section or a raised section and disposed at the portion of the cavity corresponding to the inside of the injection molded product. Therefore, the guide means can act efficiently on a curved section of the cavity (corresponding to the curved section of the injection molded product) where each divided stream has a different flow distance, and each divided stream can follow the guide means to form a grain pattern on the injection molded product. Moreover, the guide means can supplement the directional properties for each divided stream, so that the divided streams can sustain their ordered arrangement in resistance to the force of disturbing the directional properties, even if such force would act thereonto. This aspect of the present invention can certainly create a linear pattern with a generally constant width for each divided stream and produce the injection molded product with a fine grain-like pattern resembling a grain of a natural wood material on the basis of the action of each divided stream, even if the cavity is provided with a curved section corresponding to a curved part of the injection molded product, where the flow distance of the divided stream is different.

In a preferred aspect of the present invention, the resistance to the flow of each divided stream in the cavity can be rendered smaller at the site where the flow distance of the divided stream is longer relative to at the site where the flow distance of the divided stream is shorter. In this configuration, the divided stream becomes more likely to flow at the site of the cavity where the divided stream has a relatively longer flow distance than at the site where it has a relatively shorter flow distance, so that each divided stream can flow at nearly the same timing at every portion of the divided streams and reach the cavity resin reach end of the cavity at substantially the same time. Moreover, as the divided stream is arranged so as to become more likely to flow at the site where the divided stream having the relatively longer flow distance flows, the directional properties of the divided stream is supplemented and the disturbance of the directional properties of the divided stream can be suppressed in resistance to the force of the other divided streams, even if the force of disturbing the directional properties would act thereonto. Therefore, even in the case where the cavity is provided with a curved section corresponding to the curved section of the injection molded product, where the flow distance of the divided stream is different from one another, the disturbance of an ordered arrangement of the divided streams may be suppressed by the fact that the divided streams reaching the cavity resin reach end of the cavity at a faster timing enters into a flow region of the divided streams that do not yet reach the cavity resin reach end thereof on the basis of the big difference in the timing of reaching the cavity resin reach end of the cavity among the divided streams. This can ensure the sure formation of a linear pattern for each divided stream, which has a generally constant width among the divided streams and resembles a fine grain of a natural wooden material.

For the method in a preferred aspect of the present invention, the resistance to the flow of the divided streams can specifically be reduced because the means for reducing the resistance to the flow of the divided stream is designed so as to render the space corresponding to the thickness of the cavity relatively thicker in the flow region of the divided streams.

The method in a preferred aspect of the present invention can more efficiently exhibit the effects as achieved by the invention, even in the case where the cavity is provided with a curved section corresponding to a curved portion of the injection molded product wherein the flow distances of the divided streams are different from each other, because the guide means can elongate the divided streams longer at the site where the flow distance of the divided stream is longer than at the site where it is shorter.

In a preferred aspect of the present invention, the plural divided streams are created by using a plurality of gates disposed sideways along the cavity resin feed end of the cavity, together with the film gate disposed adjacent the gates and communicating with the gates. Further, the plural divided streams are guided by the guide means at the site of the cavity corresponding to the inside of the injection molded product, so that the effects as achieved by the invention can simultaneously be gained.

For the method in a preferred aspect of the present invention, the guide means is constituted by a plurality of guide grooves that can guide the divided streams at the site of the cavity corresponding to the inside of the injection molded product, and the guide grooves are disposed elongating longer at the site where the flow distance of the divided stream is longer than at the site where it is shorter. Therefore, the divided streams can be guided by the guide grooves so as to fail to disperse too widely in the widthwise direction of the divided stream. Moreover, the divided streams can be arranged so as to resist the force of disturbing or bending the flow direction of the divided streams. In addition, these functions can be exhibited effectively even in the case where the cavity is provided with a curved section corresponding to the curved portion of the injection molded product, that is, where the flow distance of each divided stream is different at different portions.

In a further aspect of the present invention, the cavity is disposed with the reinforcement member at the site corresponding to the inside of the injection molded product, and the molten resin composed of the first material and the second material having a color different from that of the first material and combined in a substantially separate state is fed to the cavity resin feed end of the cavity. Therefore, the divided stream of the second material of the molten resin is fed one after another on the basis of the feed flow of the molten resin, creating a flowing shape of the second material extending along the cavity resin feed end thereof. Thereafter, the molten resin is fed from the cavity resin feed end thereof in the form of plural divided streams into a clearance between the reinforcement member and the wall surface of the cavity. In this instance, the second material undergoes the force (the injection pressure) of flowing in the direction intersecting at a right angle to the cavity resin feed end of the cavity at the portion where each divided stream is created, then each divided stream flowing in a parabolic form into the clearance interposed between the reinforcement member and the wall surface of the cavity. After the divided streams have passed through the clearance of the cavity, then the top portion of each divided stream of the second material flows ahead on the reinforcement member toward the cavity resin reach end of the cavity while attempting to disperse in the widthwise direction of the divided stream. The widthwise extension of the divided stream of the second material, however, is then regulated by the adjacent divided streams, and each divided stream is elongated in the direction of the flow of the divided stream. In particular, for each divided stream, the speed gradient on both transverse sides in the widthwise direction of the divided stream is larger than the speed gradient on the inside in the widthwise direction thereof, so that the divided stream of the second material on the both transverse sides thereof (a linear pattern formed following the divided streams of the second material) is elongated by the shear force acting in the flow direction of each divided stream. The linear pattern is rendered narrower as the divided stream flows longer. The arrangement of the divided streams can create a grain-like pattern that has a generally constant width for each divided stream and extremely resembles a grain on a natural wood material, when the divided streams are allowed to solidify on the reinforcement member as a solidification layer. Therefore, this method can provide an injection molded product with a clear and fine grain-like pattern resembling a grain on a natural wood material.

Further, the second material of each divided stream can surely create a linear pattern having a generally constant width because the widthwise extension of the divided stream is regulated by the adjacent divided streams immediately after the entry of each divided stream into the cavity. Therefore, a fine grain-like pattern resembling a grain of a natural wooden material can be formed on the injection molded product whether it is longer or shorter.

Moreover, the linear pattern can be created in accordance with the number of the divided streams (two lines of a pattern being created for each divided stream), so that the number of the linear pattern can be increased or decreased optionally by adjusting the number of the divided streams, and a variety of fine grain-like patterns can optionally be formed on the surface of the injection molded product.

In addition, the method in this aspect of the present invention can form the fine grain-like patterns depending upon the divided streams for injection molded products in a variety of shapes such as an elbow-like shape or a cap shape, simply by setting the divided streams upon molding. This method can form the fine grain-like pattern on the entire periphery of the injection molded product.

Furthermore, this method can create the fine grain-like pattern on the basis of the divided streams in a regular manner, so that the quality of the molded product, that is, the state of the fine grain-like pattern formed, is rendered uniform and a yield of the injection molded products can be raised.

Furthermore, in the method in this aspect of the present invention, the molten resin is fed to the cavity resin feed end of the cavity in such a state in which the first material is blended with the second material in a substantially separate manner, and the divided stream of the second material can assume a flowing shape of the divided stream of the second material extending along the cavity resin feed end of the cavity in the position in front of the cavity resin feed end thereof. For this method, accordingly, any molding machine can be used as long as it has the function of feeding the molten resin to the cavity, and it may include, for example, a general purpose injection molding machine, such as a screw-type injection molding machine, a plunger-type injection molding machine, a one-head injection molding machine, or a multi-head injection molding machine. The use of such a general purpose injection molding machine can reduce costs of plant and equipment for manufacturing the injection molded products.

The method in this aspect of the present invention can also create the fine grain-like pattern on the basis of the divided streams clearly on the injection molded product by rendering the space of thickness of the cavity narrower by the disposition of the reinforcement member and as a consequence increasing the speed of the divided stream flowing under conditions of constant injection pressure at the stage of manufacturing the injection molded product. On the other hand, the reinforcement member can supplement the thinned portion of the solidification layer while ensuring a sufficient and desired amount of strength.

Furthermore, in the method in this aspect of the present invention, the molten resin is allowed to solidify in such a state that the first and second materials of different kinds are mixed in a substantially separate manner. Even if the strength of the solidification layer of the molten resin would be rendered lower as compared with the molten resin in which the first material and the second material are mixed completely, the reinforcement member can function as a supplement for the increased strength of the solidification layer, thereby ensuring the sufficient amount of strength as the injection molded product.

In the method according to a preferred aspect of the present invention, an interval between the reinforcement member and the wall surface of the cavity can be adjusted in accordance with the status of disposition of the reinforcement member so as to become relatively thicker at the site where the flow distance of each divided stream is longer in the direction of the flow of the divided stream. Therefore, the divided stream can be rendered more likely to flow simply by the adjustment of the reinforcement member at the site where the flow distance of each divided stream is relatively longer, so that each divided stream can be adjusted so as to reach the cavity resin reach end of the cavity at nearly the same timing. Moreover, the likelihood of the divided streams to flow at the identical timings can enhance the directional properties of the divided streams at the site where the flow distance of the divided stream is relatively longer, so that the disturbance of the directional properties of the divided stream can be suppressed in resistance to the force of disturbing the directional properties of the divided stream, even if the force would act upon the divided streams. This can also suppress the disturbance of an ordered arrangement of the divided streams, even if the cavity is provided with a curved section corresponding to the curved portion of the injection molded product and the flow distances of the divided streams are different from one another, the disturbance being otherwise caused by the fact that the divided streams reaching to the cavity resin reach end of the cavity reach faster enter into a flowing region of the divided streams that do not yet reach the cavity resin reach end thereof on the basis of the big difference in timing of the divided streams reaching the cavity resin reach end thereof. Therefore, a linear pattern with a generally constant width resembling a grain of a natural wood material can be formed on the entire length for each divided stream.

Further, in this aspect of the present invention, the thickness of the solidification layer becomes irregular, so that the reinforcement member to render the thickness of the injection molded product constant or thick as required by the design because the reinforcement member can correct the irregular thickness of the solidification layer.

Moreover, the substantial interval of the cavity for the thickness of the injection molded product can be adjusted by the reinforcement member, not by a mold, so that the adjustment can be effected readily as compared with the adjustment by means of the mold itself.

The method in a preferred aspect of the present invention can achieve the effects as achieved by the invention by specifically utilizing the adjustment of thickness by the reinforcement member as a flow resistance adjustment means for adjusting the flow resistance of each divided stream because the adjustment of an interval between the reinforcement member and the wall surface of the cavity is effected by the adjustment of thickness by the reinforcement member.

Furthermore, in the invention in a preferred aspect, guide grooves are disposed in a space between the reinforcement member and the wall surface of the cavity and each of the divided streams is guided by the guide groove. Therefore, even in the case where the cavity is provided with a curved section corresponding to the curved portion of the injection molded product, i.e., where the flow distances of the divided streams are different at different portions, each divided stream is allowed to flow with the directional properties in accordance with the guide grooves disposed on the reinforcement member, and the disturbance of the directional properties is suppressed by the disposition of the guide grooves. Moreover, this configuration allows an ordered arrangement of the divided streams on the basis of the supplement of the directional properties of each divided stream because each divided stream can resist the force of disturbing the directional properties of each divided stream even if the force would act upon it. Therefore, even if the cavity is provided with a curved section corresponding to the curved portion of the injection molded product and the flow distances of divided streams are different from one another, the reinforcement member ensures a sufficient amount of strength, and a linear pattern with a generally constant width can be created for each divided stream on the basis of the action of each divided stream. Therefore, a fine grain-like pattern resembling a natural grain of a wooden material can be formed on the injection molded product.

In this aspect of the method as described above, the solidification layer is provided with the depressed and raised portions on the inside thereof by means of the guide grooves, however, the irregular thickness of the solidification layer can be rendered constant by the provision of the reinforcement member (by the functions of the reinforcement member to adjust the thickness and the inner surface) which laminates the solidification layer. Therefore, the inside surface of the injection molded product can be rendered flat so that easy maneuverability and better appearance can be achieved.

Moreover, the guide grooves can increase the area of attachment of the reinforcement member to the solidification layer, so that the strength of attachment between the two elements can be enhanced.

In addition, the injection molded product can be produced more readily by forming the reinforcement member in the guide grooves, as compared with the formation in the mold.

In a further aspect of the present invention, the device for use in the preparation of the injection molded product with a grain-like pattern is provided with a gate at the cavity resin feed end of the cavity, which is disposed so as to flow the molten resin into the cavity in a side-by-side arrangement of plural divided streams. The device can produce the injection molded product with a grain-like pattern by utilizing the characteristics of the plural divided streams.

The device in a preferred aspect of the present invention contains a plurality of the gates arranged sideways. This mode of the device can form a plurality of the divided streams and eventually produce the injection molded product with a grain-like pattern.

The device in a preferred aspect of the present invention contains the plurality of the gates comprising overlap gates. For the device of this invention, the flow direction (a passage) of the molten resin entered into the overlap gates is changed inside the device, so that the best possible balanced flow of the divided streams can be created by each of the overlap gates on the basis of the change of the flow direction of the molten resin entered into the overlap gates. Therefore, a linear pattern can be sustained in a generally constant width over the entire length for each divided stream. Accordingly, this device can produce the injection molded product with a grain-like pattern resembling a natural grain on a wooden material having less variation in the width of the line of the linear pattern.

In a preferred aspect of the present invention, a film gate communicating with each of the plural divided streams is disposed adjacent the plural divided streams at the cavity resin feed end of the cavity. The device can act in the like manner as in the method, so that it can produce the injection molded product with a grain-like pattern resembling a fine grain pattern on a natural wooden material without less variation in the width of the linear pattern, whether the length of the pattern is longer or shorter.

For the device in a preferred aspect of the present invention, the gate is disposed so as to create a plurality of divided streams by locating a plurality of partitions for the fan gate. Therefore, the device can form the plurality of the divided streams and eventually produce the injection molded product with a grain-like pattern.

For the device in a preferred aspect of the present invention, the cavity resin feed end of the cavity is provided with the film gate disposed adjacent the plural gates and communicating with the inside of the gates. Therefore, this device can act in substantially the same manner as by the method and produce the injection molded product with a fine grain-like pattern resembling a grain on a natural wood material, without large variation in width of the pattern, whether the full length of the divided streams is longer or shorter.

In a preferred aspect of the invention, the device is provided with the passage of the cavity for the molten resin reaching the gates which has a curved passage section, so that the curved passage section of the device can suppress the disturbance of the flow of the molten resin and stabilize the injection pressure in front of the gates, so that each divided stream formed by the gates can be stabilized in the passage portion reaching the gates.

For the device in a preferred aspect of the present invention, the opening valve is provided at the cavity resin feed end of the cavity, and the opening valve is set so as for the plural divided streams to flow simultaneously into the cavity from the cavity resin feed end thereof at the time of opening the valve. Therefore, the device can act in substantially the same manner as by the method and produce the injection molded product with a grain-like pattern resembling a fine grain-like pattern of a natural wooden material without a great variation in the width of the linear pattern by equalizing the timing of feeding each divided stream, whether the full length of the divided stream is longer or shorter.

For the device in a preferred aspect of the present invention, the resistance to the flow in the gates are set to become relatively greater at the site of the cavity where the timing of feeding the divided streams into the cavity becomes faster. The device can adjust the timings of feeding the divided streams on the basis of the adjustment of the resistance to the flow of the divided streams so as to become equal to one another. Further, this device can produce the injection molded product with a grain-like pattern resembling a fine grain-like pattern of a natural wood material without a great variation in the width of the linear pattern, whether the full length of the divided stream is longer or shorter.

For the device in a preferred aspect of the present invention, the device is provided with a guide means for guiding each divided stream at the site of the cavity corresponding to the inside of the injection molded product with a grain-like pattern. The device in this aspect can act in the like manner as in the method and produce the injection molded product with a grain-like pattern resembling a grain on a natural wooden material without a big variation of the width of the linear pattern on the basis of the function of the guide means, whether the full length of the divided stream is longer or shorter.

The device in a preferred aspect has the thickness space in the cavity rendered thicker at the site of the cavity where the flow distance of the divided stream is relatively longer than at the site where the divided stream is shorter. This device can act in substantially the same manner as in the method and produce the injection molded product with a grain-like pattern resembling a grain on a natural wooden material without a big variation in the width of the linear pattern, whether the full length of the divided stream is longer or shorter.

For the device in a still further aspect of the present invention, the reinforcement member is disposed at the site of the cavity corresponding to the inside of the injection molded product, and a plurality of the gates are arranged sideways in a space interposed between the reinforcement member and the wall surface of the cavity, and the reinforcement member is set so as for the molten resin to flow sideways in the form of plural divided streams. Therefore, the device can produce the injection molded product with a grain-like pattern by utilizing the action of the plural divided streams on the reinforcement member.

For the device in a preferred aspect of the present invention, the interval interposed between the reinforcement member and the wall surface of the cavity is set to become relatively thicker by means of the reinforcement member at the site of the cavity where the flow distance of each divided stream becomes longer in the direction of the flow of each divided stream. Therefore, the device can act in substantially the same manner as in the method in the aspect of the present invention on the basis of the easy adjustment of the intervals by using the reinforcement member. Furthermore, this device can surely form a linear pattern resembling a grain on a natural wooden material having a generally constant width over the entire length of each divided stream even in the case where the cavity is provided with a curved section corresponding to the curved portion of the injection molded product and where the flow distances of the divided streams are different from one another.

The device in a preferred aspect of the present invention is provided with the reinforcement member having a plurality of guide grooves at a clearance between the reinforcement member and the wall surface of the cavity, and the guide grooves are disposed sideways extending toward the direction of the flow of each divided stream. This device can further form a linear pattern having a generally constant width for each divided stream on the basis of the action of each divided stream and produce a fine grain-like pattern resembling a grain on a natural wooden material, while the reinforcement member ensures a sufficient degree of strength for the injection molded product.

Moreover, the guide grooves are provided for the reinforcement member so that they can be formed more easily when it is formed directly on the mold.

BRIEF DESCRIPTION OF THE ACCOMPANYING DRAWINGS

BEST MODES OF CARRYING OUT THE INVENTION

A description of the present invention will be given regarding working embodiments with reference to the accompanying drawings.

Figure 1:
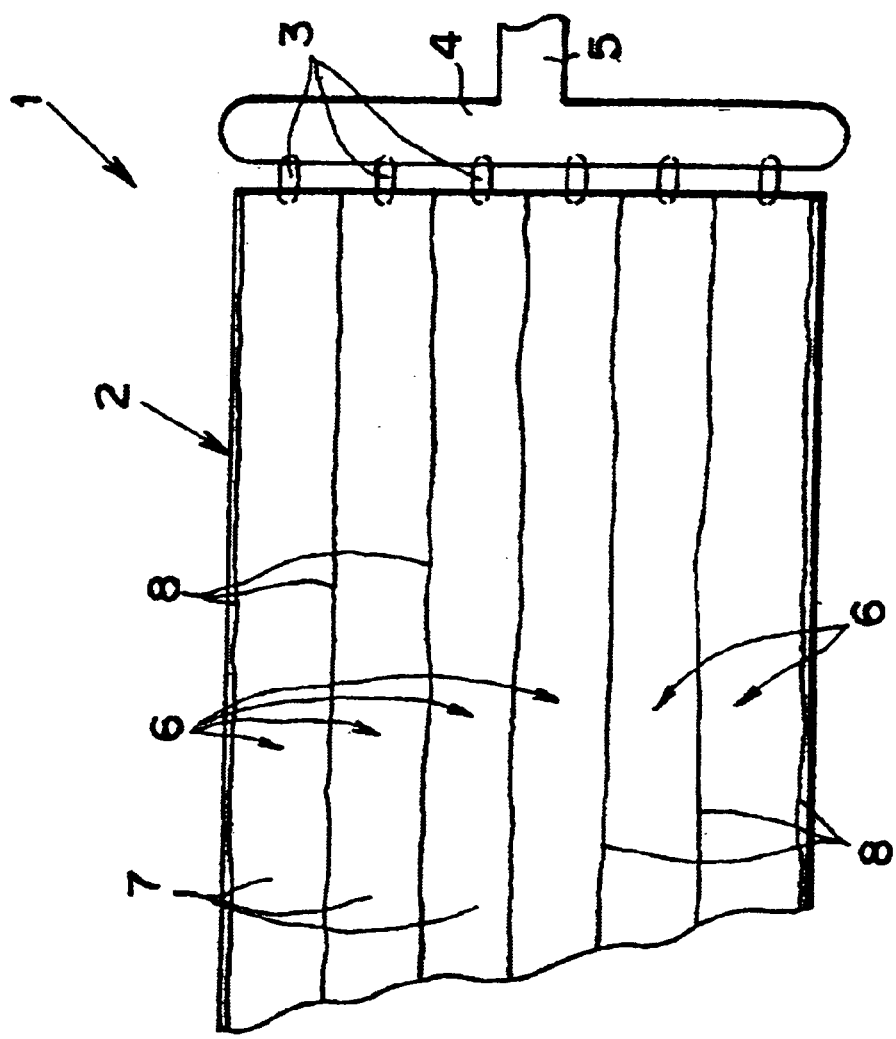
FIG. 1 is a plan view showing an injection molded product according to the first embodiment of the present invention, prior to finish processing after molding.
Figure 2:
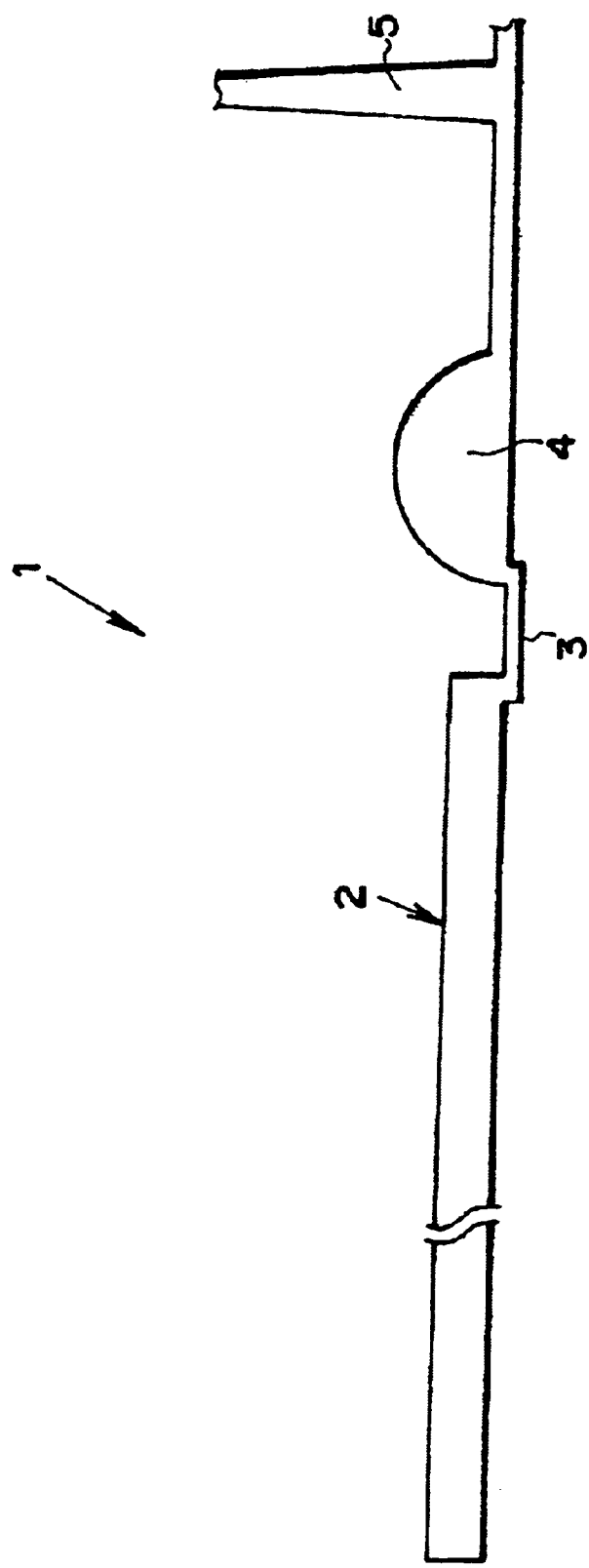
FIG. 2 is an enlarged side view of FIG. 1.

FIGS. 1 to 8 illustrate an injection molded product according to the first embodiment of the present invention, which has been injection molded. As shown in FIGS. 1 and 2, reference numeral 1 denotes an injection molded product which has just been injection molded, which comprises a product part 2 in an elongated plate form, which has been produced by allowing a molten resin material to solidify, and a gate section 3 attached to the product part 2, a runner section 4, and a spool section 5. The gate section 3, the runner section 4, and the spool section 5 are removed after molding. The product part 2 in an elongated plate form can be applied to various products, such as panels and so on.

As shown in FIG. 1, the product part (molded product) 2 in the elongated plate form has a plurality of divided stream traces 6 left intact on the surface thereof on the basis of a plurality of divided streams of a molten resin material.

The molten resin material may comprise a first material with a second material contained therein. The first material may have a color or a tone different from that of the second material. At the stage of molding, the resin material may be used before the first material is blended with the second material in an incompletely mixed state, i.e., in a state in which the first and second materials are mixed together completely, more specifically, in a state that the first material is blended with the second material so as to visibly distinguish the color or tone of the both materials from each other.

The first material may include, for example, an ABS (acrylonitrilebutadiene-styrene) resin, a TPE (thermoplastic elastomer) resin (of an olefinic type, a nylon type, a urethane type, etc.), and so on. The first material may be used singly or in combination with two or more. The second material may include, for example, a PP (polypropylene) resin, a PBT (polybutyrene terephthalate) resin, a PET (polyethylene terephthalate) resin, and so on. The second material may also be used singly or in combination with two or more. The first material and/or the second material may contain a colorant, pigment, wooden powder, and so on, which in turn may be blended in an appropriate amount in accordance with the type of a grain-like pattern to be formed on the surface of a product. The first material may be blended with the second material preferably at a rate of approximately 5 by parts by weight of the first material with respect to 100 parts by weight of the first material. When wooden powder may be added, they may be added at a rate of approximately 5% to 50% by weight with respect to the second material. The rate of blending may be added preferably at the rate of approximately 10% from the point of view of wood-like appearances, molding properties, and so on.

The plural divided stream traces 6, each divided stream trace having a generally constant width, are arranged sideways (in a left-and-right direction in FIG. 1) and gradually elongated longitudinally (in a up-and-down direction in FIG. 1) to form the product part 2. Each of the divided stream traces 6 is then allowed to solidify into the form of a first solidification layer section 7 composed mainly of the first material and a second solidification layer section 8 composed mainly of the second material. The first solidification layer section 7 of the first material and the second solidification layer section 8 of the second material are formed in the product part 2 as well as on the surface thereof.

Each of the divided stream traces 6 composed mainly of the first material is elongated on the inside of the divided stream in the direction of elongation of the product part 2 (in the up-and-down direction in FIG. 1) and allowed to solidify as the first solidification layer section 7 that occupies a nearly entire area of each stream trace 6. On the other hand, each of the divided stream traces 6 composed mainly of the second material is elongated on one of the side end portions of each divided stream in the direction of elongation of the product part 2 (in the up-and-down direction in FIG. 1) and allowed to solidify as second solidification layer section 8, so that the second solidification layer section 8 is formed as a trace following a narrower line pattern on the surface of the product part as compared with the first solidification layer section 7.

Then, a description will be given regarding a method for the preparation of the molded product 1 (the product part 2) and a device for use with the method for the preparation of the molded product 1 according to the present invention.

Before describing the method for the preparation of the molded product, the device for use with the method for the preparation thereof, together with the action of the device for the preparation thereof, will be described with reference to the accompanying drawings.

Figure 3:
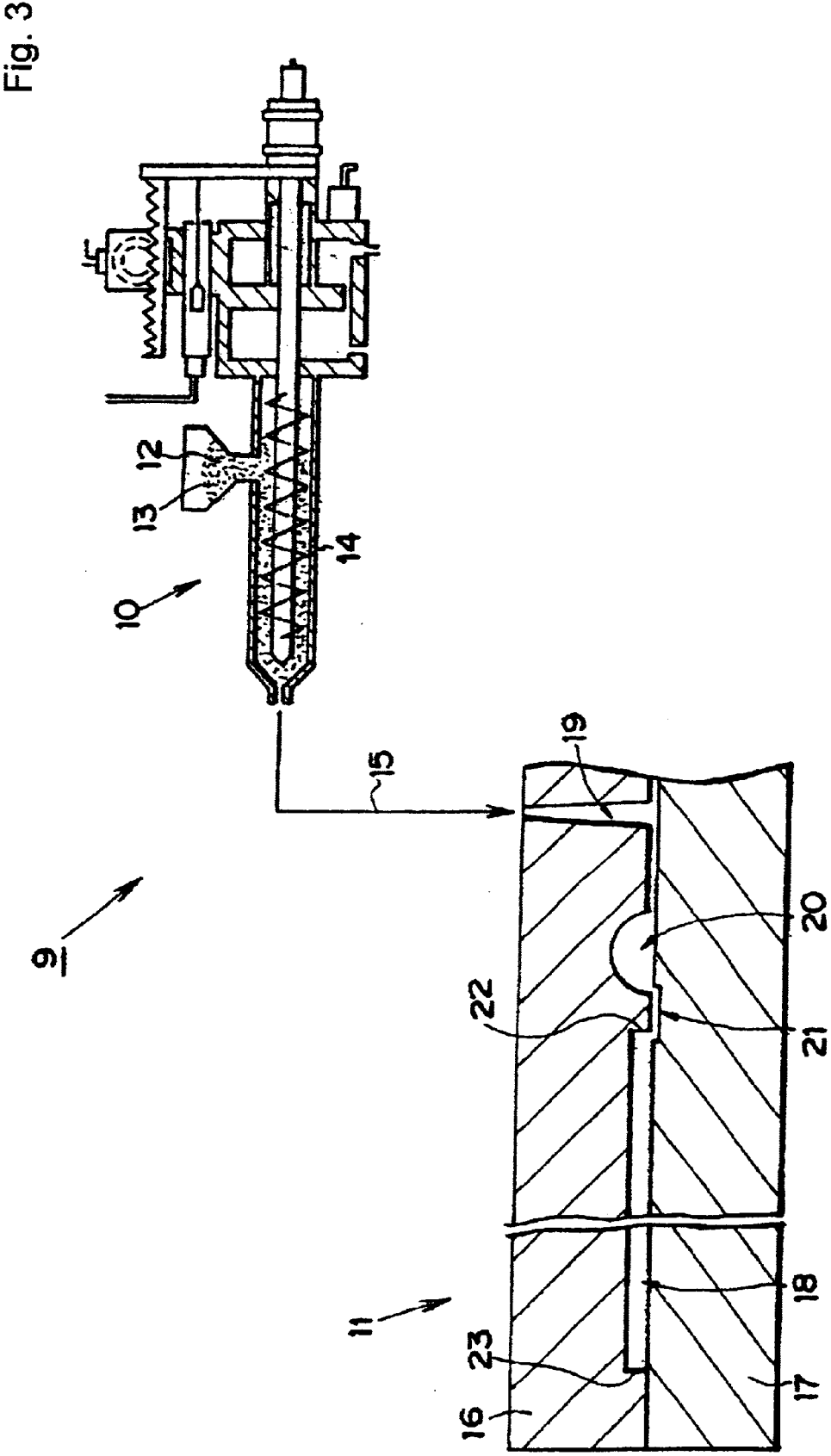
FIG. 3 is a schematic view describing a device for the preparation of the injection molded product according to the first embodiment of the present invention.

As shown in FIG. 3, the device 9 for use in the preparation of the molded product 1 comprises a molding machine 10 and a mold 11.

In accordance with the above embodiment of the present invention, the molding machine 10 may comprise an injection molding machine of a general screw type. The molding machine 10 is provided with a cylinder 14 that produces a molten resin material 15 (indicated by the arrow in FIG. 3) from first solid pellets 12 as a raw material for the first material and second solid pellets 13 as a raw material for the second material. The molding machine 10 has the function of feeding the molten resin material 15 to the mold 11 at a given pressure (an injection pressure). Upon the formation of the molten material 15, the molding machine 10 can blend the first material with the second material in a substantially separately mixed state, for example, by adjusting the temperature within the cylinder 14 or by any other appropriate way.

Figure 4:
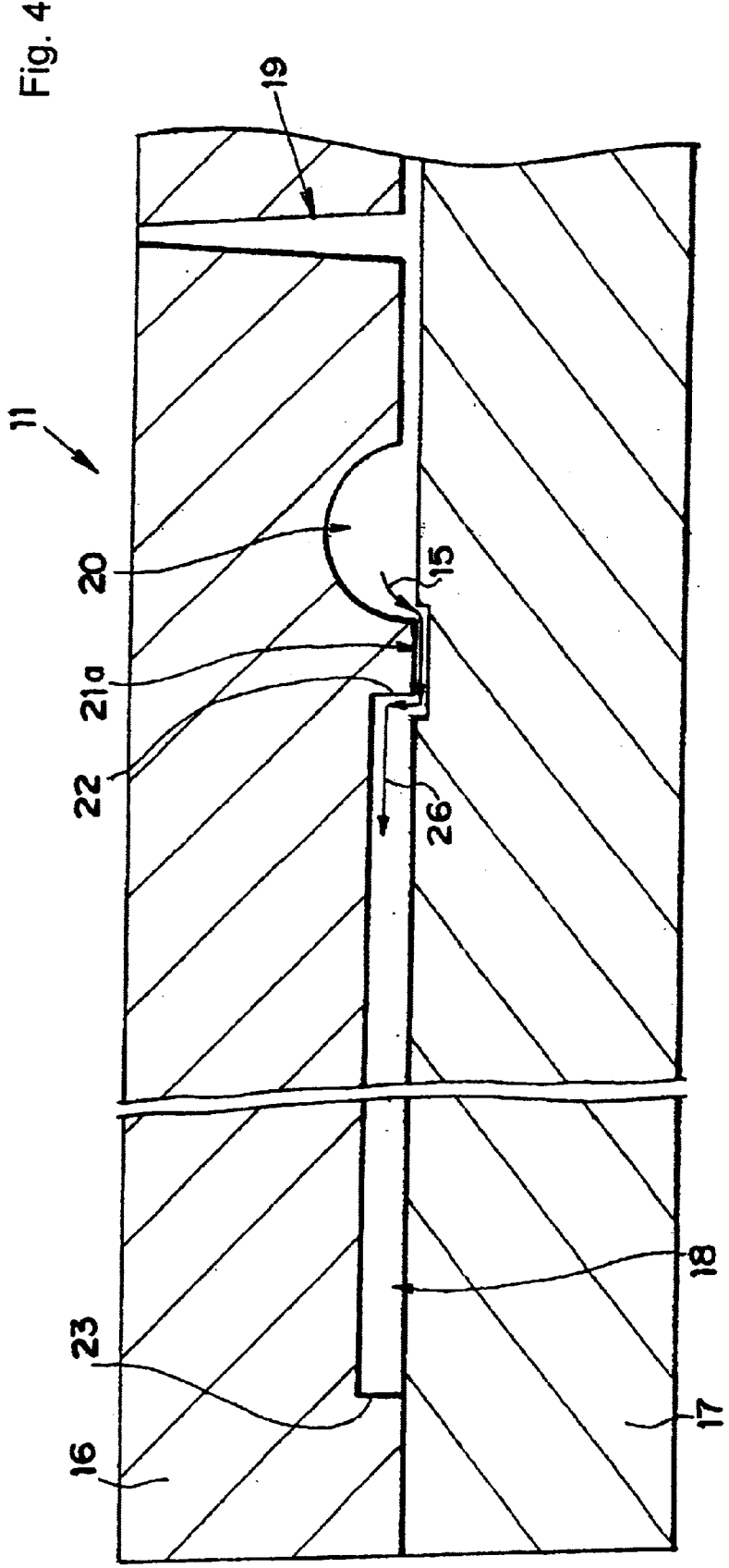
FIG. 4 is an enlarged sectional view showing a mold for use in connection with the first embodiment of the present invention.

As shown in FIGS. 3 and 4, the mold 11 comprises a top mold section 16 and a bottom mold section 17. The top mold section 16 and the bottom mold section 17 form a main body cavity comprising a cavity 18, a spool 19, a runner 20, and a gate 21 within the inside as shown in FIGS. 3 to 6, as they are fastened together by a fastening mechanism (although not shown).

The cavity 18 may constitute a clearance corresponding to the shape of the product part 2, for example, in an elongated plate form in this embodiment. The cavity 18 has a clearance having a given width and a given thickness so as to form the product part 2 and further elongates from a cavity resin feed end 22 thereof to a cavity resin reach end 23 thereof, the cavity resin feed end 22 being located at the entrance of the cavity 18 at which the resin material enters into the cavity and the cavity resin reach end 23 being located on the opposite end of the cavity to the cavity resin feed end 22 thereof and being the end at which the resin material reaches the opposite side end of the cavity 18.

The spool 19 constitutes a passage of the molten resin material, which receives the molten resin material 15 from the molding machine 10 and which leads the molten resin material 15 into the runner 20 communicating with the runner 20. The spool 19 may be provided with a curved section (a curved path) that can change the direction of a flow of the molten resin material 15.

The runner 20 constitutes a passage that connects the spool 19 to the gate 21. The runner 20 may be in a generally semi-circular section and extends in the direction parallel to and along the cavity resin feed end 22 of the molten resin material 15 in this embodiment (see FIGS. 5 and 6).

In accordance with the embodiment of the present invention, the gate 21 uses a plurality of overlap gates 21a, each of which is disposed at a spaced relationship apart at a given interval in the direction in which the runner 20 extends, that is, opposite to the feed end 22 of the cavity 18. Each of the overlap gates 21a allows the runner 20 to communicate with the cavity 18 astride the bottom side of the runner 20 and the side end of the cavity 18 in the vicinity of the cavity resin feed end 22.

Now, a description will be given below regarding the method for the preparation of the molded product 1 (the product part 2), together with the action of the method for the preparation thereof.

Figure 5:
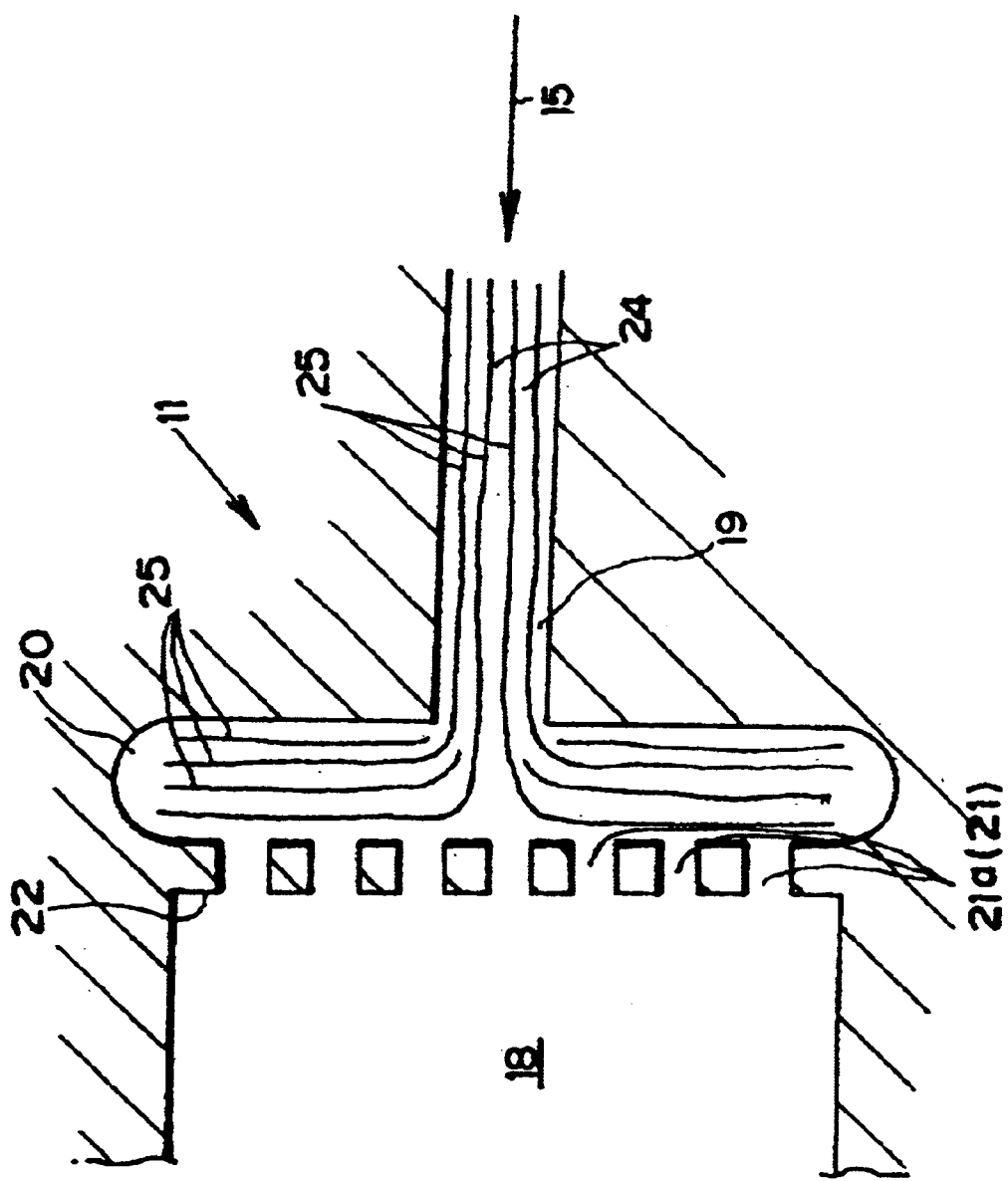
FIG. 5 is a schematic view describing the flow of the molten resin in the mold.
Figure 6:
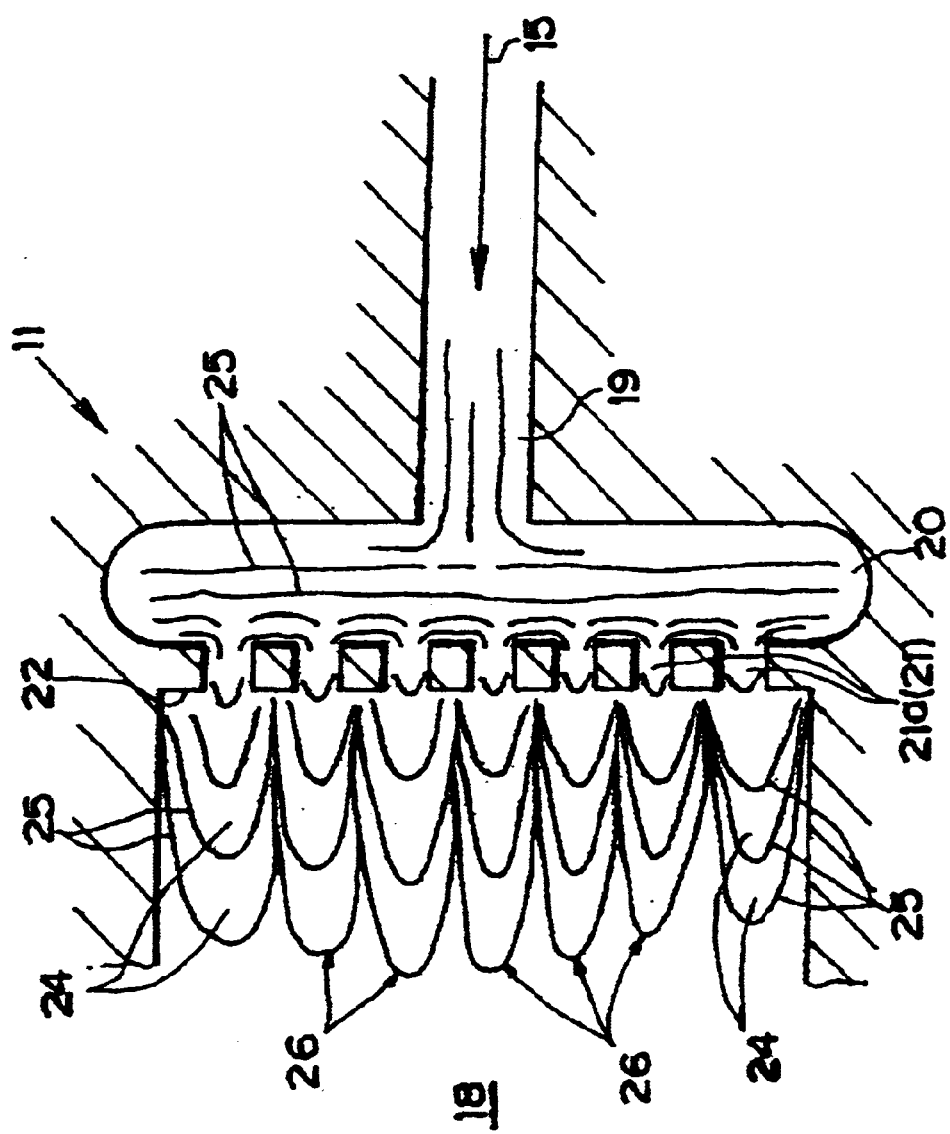
FIG. 6 is a status view describing the continuation of FIG. 5.

To the cylinder 14 of the molding machine 10 are supplied the first solid pellets 12 for the first material and the second solid pellets 13 for the second material each at a given feed speed, thereby forming the molten resin material 15 comprising the first material 24 and the second material 25 and then feeding the molten resin material 15 continually to the mold 11. The second material 25 of the molten resin material 15 follows the feed passages of the molten resin material 15 and forms a plurality of linear streams flowing along the feed passages thereof, and the plural linear streams of the second material 25 are then flown to the runner 20 via the spool 19 on the basis of the feed passages thereof, as shown in FIG. 5. In the runner 20, they further flow in and along the direction in which the runner 20 extends (i.e., along the cavity resin feed end 22 of the cavity), while forming a flowing shape of the linear stream.

At this time, the pulsation of the molten resin material 15 and other movements thereof can be controlled if there is a curved portion (a curved passage) in the spool 19 or the other part.

Figure 7:
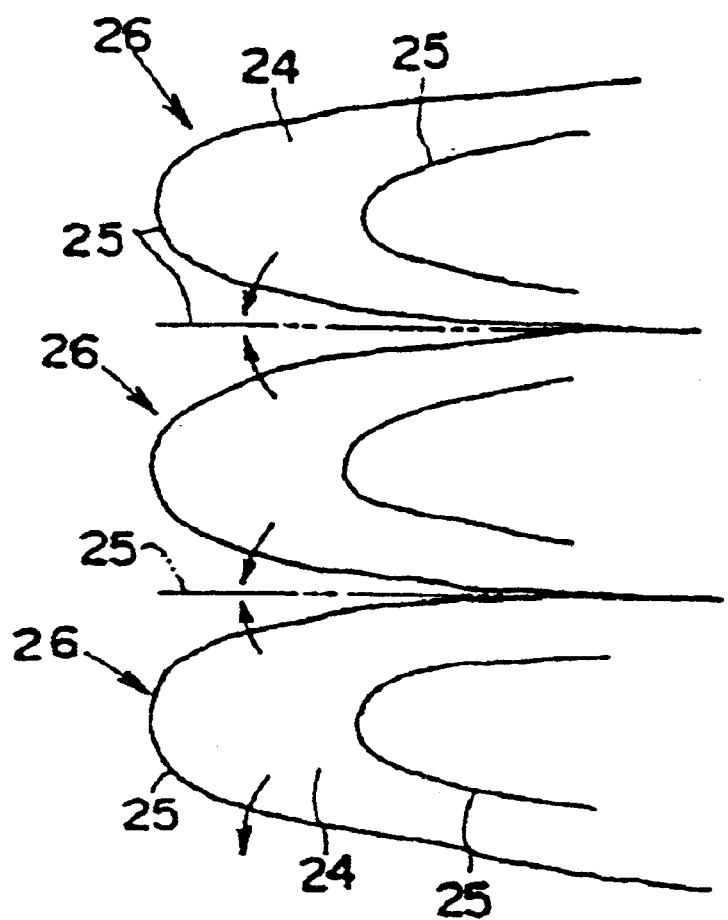
FIG. 7 is a schematic view describing the creation of a flow pattern of the second material for each divided stream.

Once the runner 20 is filled with the molten resin material 15, the molten resin material 15 is pushed at a given injection pressure into the cavity 18 through each of the overlap gates 21a. The overlap gates 21a separate the molten resin material 15 into the number of divided streams 26 corresponding to the number of the overlap gates 21a. Each of the divided streams 26 passes through the corresponding overlap gate 21a and flows into the cavity 18 while describing a parabola. The divided streams 26 each in a parabolic form then flow from the cavity resin feed end 22 of the cavity 18 toward the cavity resin reach end 23 thereof. As the top end portion of each divided streams 26 of the molten resin material 15 reaches the cavity resin reach end 23 in a certain period of time, then each top end portion of the divided streams 26 begins flowing extending in the widthwise direction. At this time, each of the divided streams 26 interferes with the adjacent divided streams 26 and regulates the widthwise extension of the adjacent divided streams 26, thereby continuing the flow approximately parallel to each other. In association with this flow of the divided streams 26 of the first material 24 of the molten resin material 15, the top end portion of each divided stream 26 of the second material 25 also flows toward the cavity resin reach end 23, as shown in FIG. 7, and then begins to extend in the widthwise direction as it reaches the cavity resin reach end 23 in substantially the same manner as the divided streams 26 of the first material 24. The widthwise extension of the second material 25 of the divided streams 26, however, is regulated by the adjacent divided streams 26, thereby suppressing the flow in the widthwise direction of the divided stream and flowing generally parallel to each passage of the divided streams 26 while forming a stream of the second material 25 having a pattern with a given constant width for each divided stream 26. In particular, the speed gradient of each divided stream 26 at each of the both outside portions in the widthwise direction is larger than the speed gradient thereof at the inside portion in the widthwise direction, so that the patterned flow of the second material 25 of the molten resin material 15 on the outside portions of each divided stream 26 is elongated in the direction of the flow of each divided stream on the basis of shear force and it is turned into a smaller stream as it is gradually elongated.

It is noted as a matter of course that a linear pattern formed as traces of the divided streams 26 is formed inside as well as on the surface of the divided stream 26, as the pattern of the second material 25 of the molten resin material 15 is formed on the basis of the action of each divided stream 26.

As the molten resin material 15 is fed at approximately concurrent timings in a form of the divided streams 26 into the cavity 18 through the plural overlap gates 21a, the widthwise extension of the second material 25 in each of the divided streams 26 is regulated from the adjacent flows of the divided streams 26 as they pass through the overlap gates 21a. Therefore, the pattern of the second material 25 begins being formed as each divided stream 26 passed through each overlap gate 21a. In this case, the overlap gates 21a as the gate 21 change the direction of the flow of the molten resin material 15, as shown in FIG. 4, so that the force of each of the divided streams 26 flown out from the overlap gates 21a is balanced and harmonized with the timings of feeding the molten resin material 15 to each of the overlap gates 21a at the connection of the runner 20 to the overlap gates 21a and the connection of the overlap gates 21a to the cavity 18. This also contributes to the formation of a pattern of the flow of the second material 25 immediately after the passage through the gate 21 from the cavity resin feed end 22 without causing a big variation in width for each of the divided streams 26.

As the molten resin material 15 has been supplied into the cavity 18, that is, as the cavity 18 has been filled with the molten resin material 15 in the form of the plural divided streams 26, the molten resin material 15 is then allowed to stand and solidify. After the molten resin material 15 becomes solid, the top mold section 16 and the bottom mold section 17 are opened to discharge a molded product 1 from the mold.

Therefore, the first embodiment of the present invention can provide the molded product 1 (a product part 2) having a fine grain-like pattern resembling remarkably a natural wooden grain, which forms a linear pattern each having a generally constant width for each divided stream 26, regardless of the full length of the divided stream, including a relatively short length thereof.

It is to be understood herein that, upon forming the product part 2, the number of the flows of the second material 25 can optionally be increased or decreased by adjusting a number of the divided streams 26 (so as to form a linear pattern of the second material 25 each on the both sides of each divided stream 26) and a variety of patterns in the flow of the second material 25 can be formed by changing the number of the divided streams 26.

The injection method according to the present invention can send the molten resin material 15 to the cavity resin feed end 22 of the cavity in a state in which the second material 25 is blended incompletely with the first material 24, that is, in which the first and second materials are blended so as to distinguish the one from the other visibly and arrange the second material 25 of the molten resin material 15 in a form of flows in front of the cavity resin feed end 22 by utilizing the movement of the passage of the molten resin material 15, so as to extend linearly from and along the cavity resin feed end 22. Further, the present invention can decrease costs of instrument because it can use a general-purpose injection molding machine, even without using a multi-head injection molding machine, for forming a pattern on a molded product.

Figure 8:
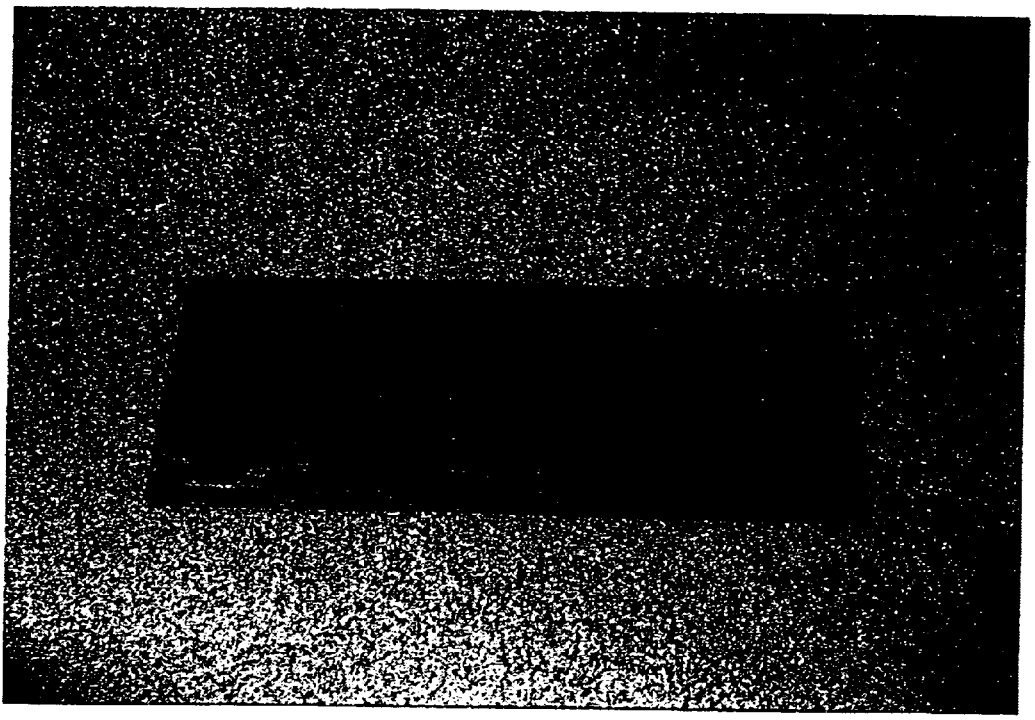
FIG. 8 is a photograph indicating a surface of a product part (a molded product) according to the first embodiment of the present invention.

FIG. 8 is a photograph representing the product part 2 in a plate form. This photograph can recognize a fine grain-like pattern from the start end (the cavity resin feed end) to the finish end (the cavity resin reach end) on the surface of the product part 2.

In this embodiment, the product part 2 was molded under the following molding conditions:
1) Size: length, 125 mm; width, 50 mm; thickness, 1 mm;
2) Gate: number, 10; kinds, multi-point overlap gates with different sizes+film gate;
3) Resin: First resin, ABS; second resin, PBT;
4) Injection conditions: cylinder temperature, 235°; mold temperature, 60°; maximum injection pressure, 1,500 kg/cm2;
5) Miscellaneous: Mold fastening force, 150 tons; screw size of injection molding machine, 46 mm.

Figure 9:
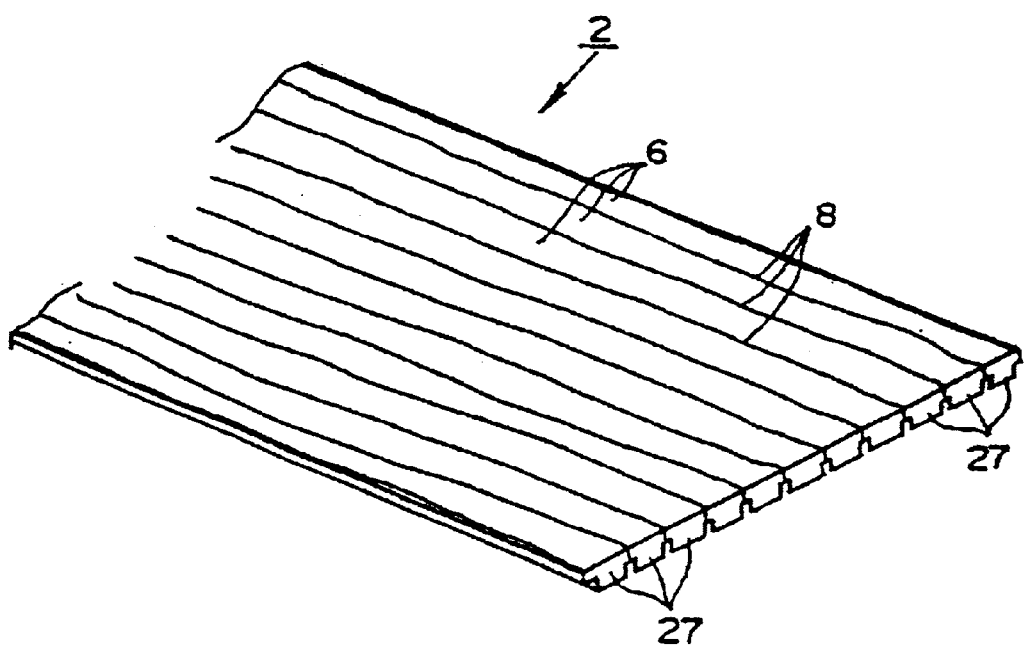
FIG. 9 is a perspective view showing a product part (a molded product) according to a second embodiment of the present invention.
Figure 10:
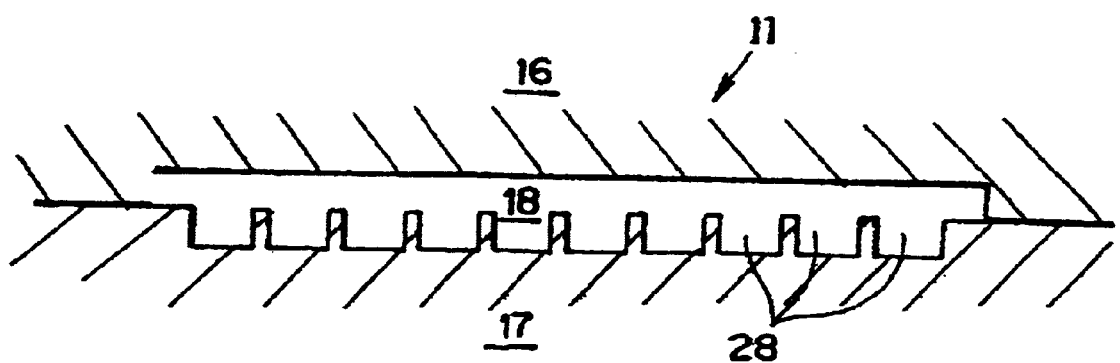
FIG. 10 is a partially enlarged view in section showing a mold for use in molding the molded product of FIG. 9.
Figure 18:
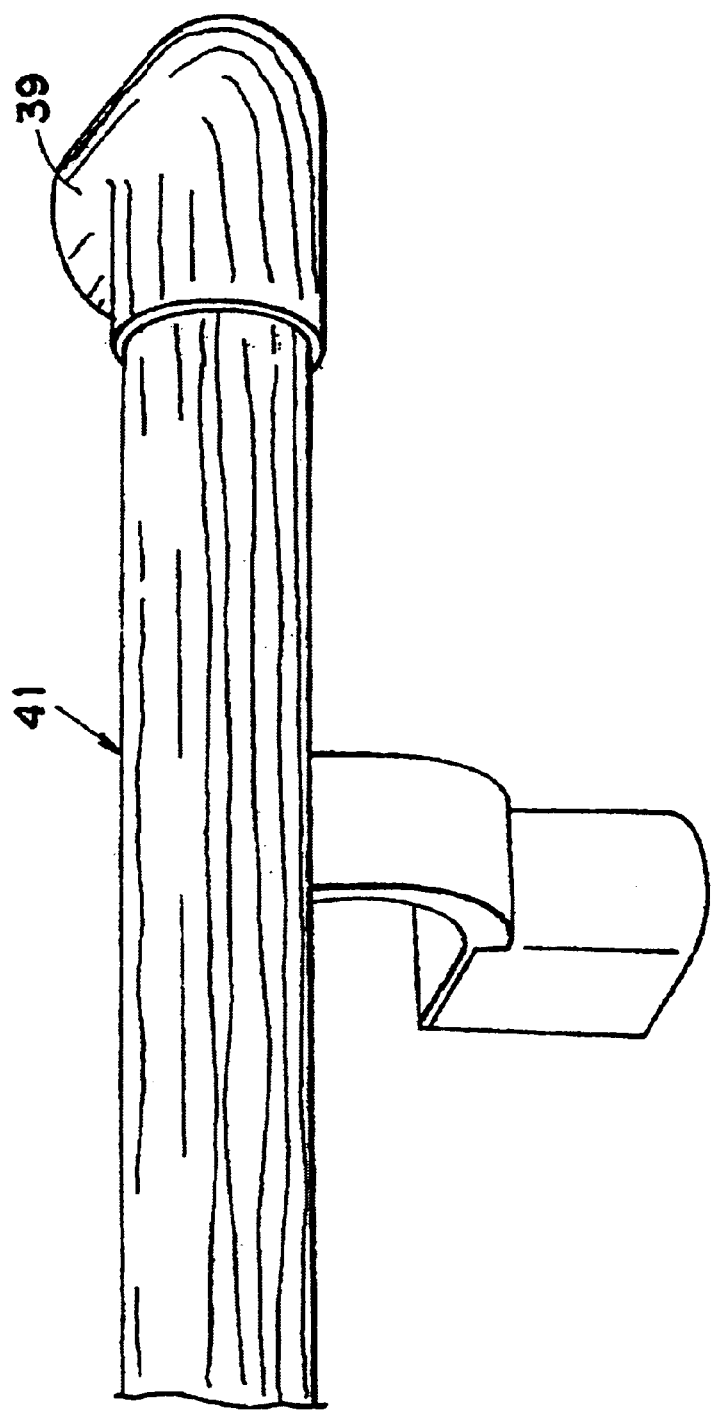
FIG. 18 is a perspective view showing a handrail using a molded product (a curved cylindrical body) according to a fourth embodiment of the present invention.
Figure 19:
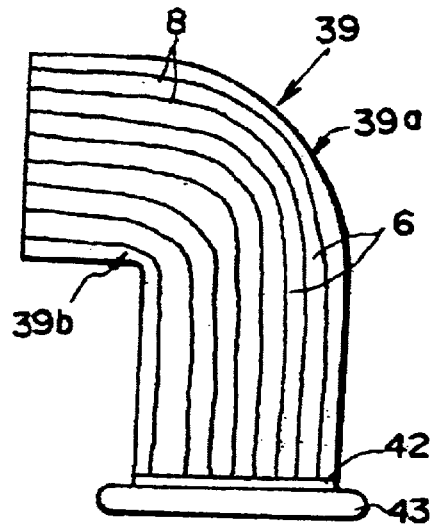
FIG. 19 is a view showing the molded product according to the fourth embodiment.
Figure 20:
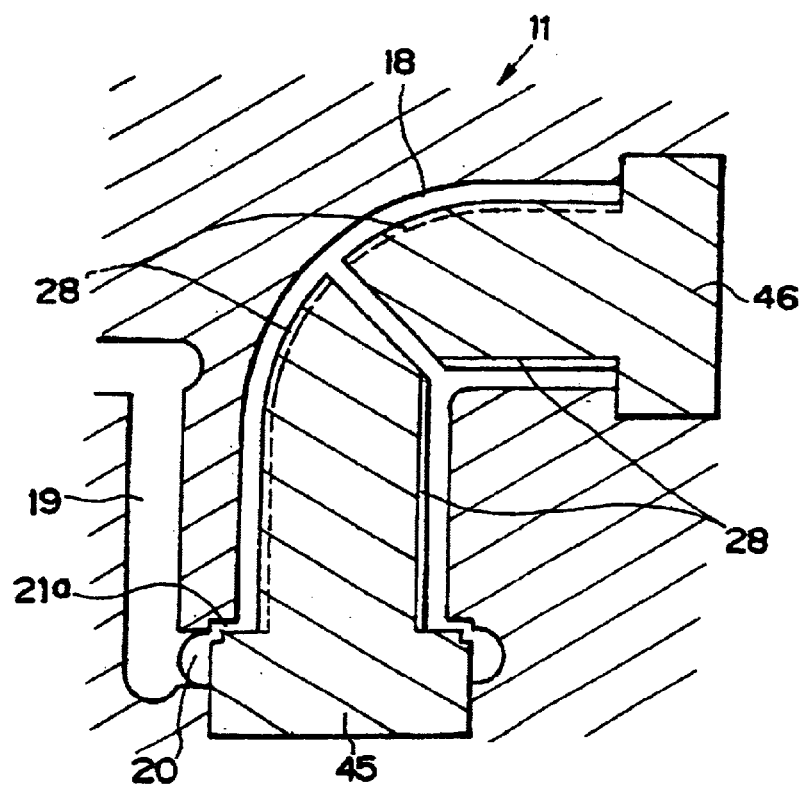
FIG. 20 is a partially enlarged view in section showing a mold for use in connection with the fourth embodiment.
Figure 25:
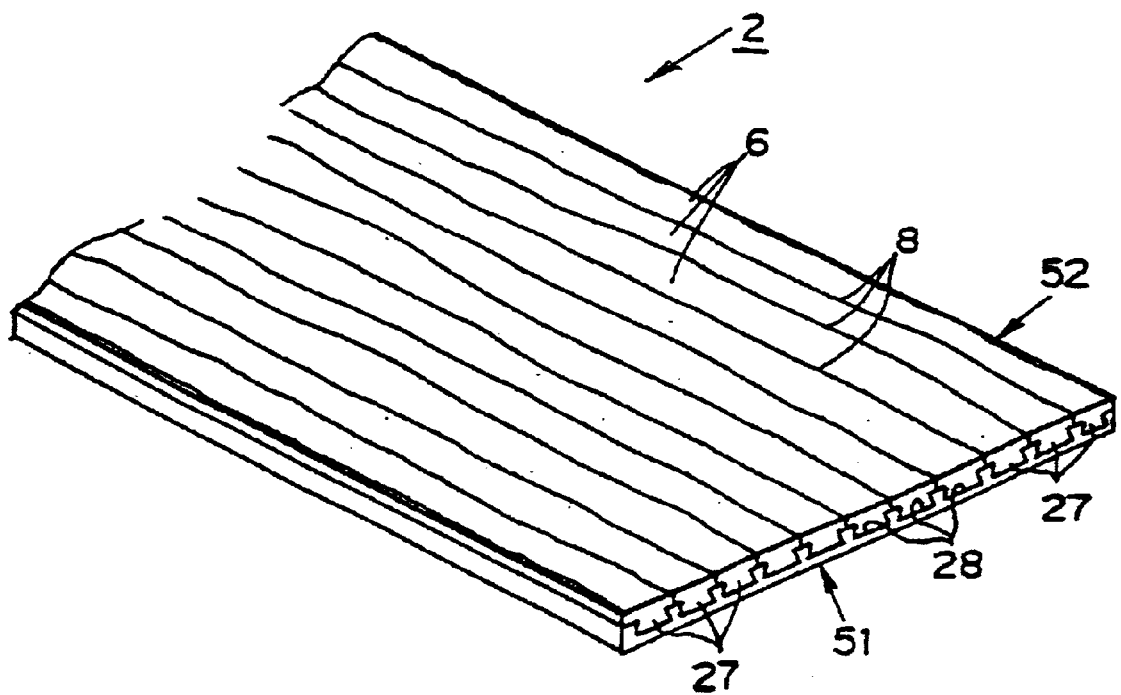
FIG. 25 is a perspective view showing a product portion (a molded product) according to a sixth embodiment of the present invention.
Figure 26:
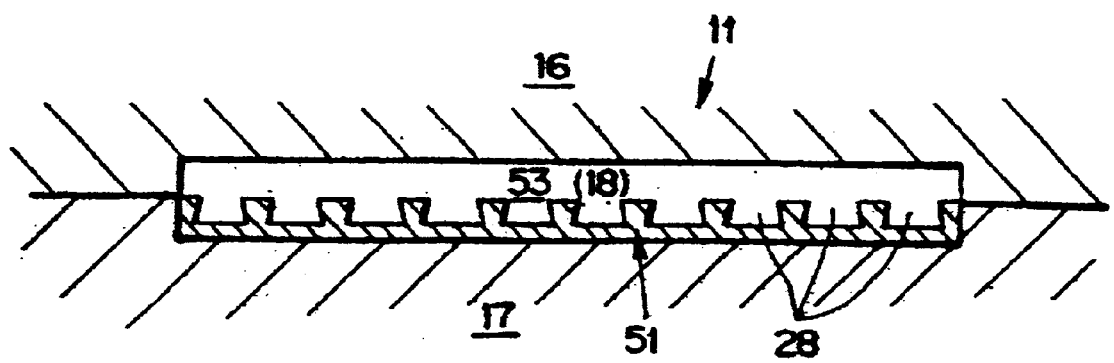
FIG. 26 is a partially enlarged view in section showing a mold for use in molding the molded product of FIG. 25.
Figure 27:
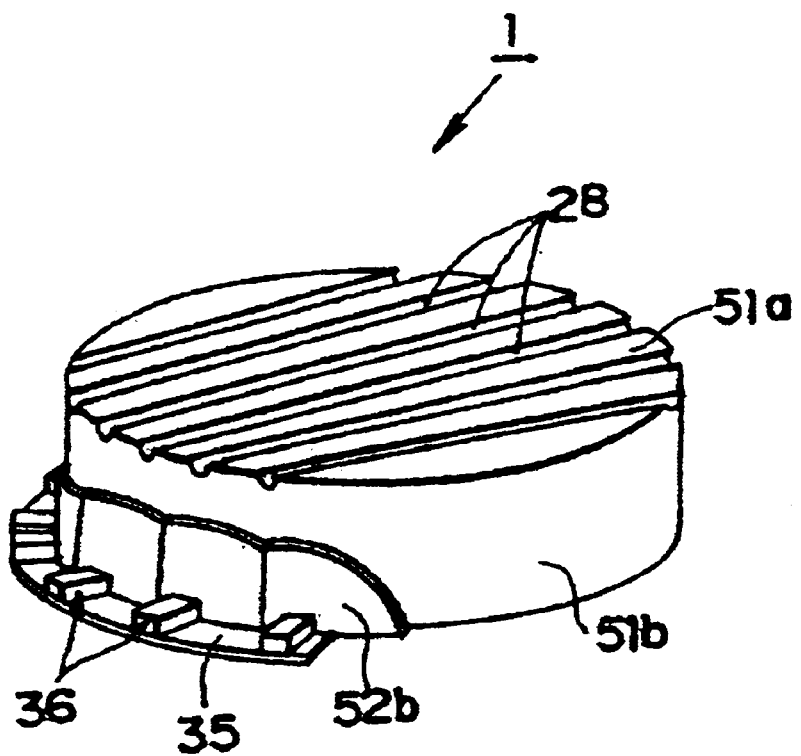
FIG. 27 is a schematic view describing the injection molding in accordance with a seventh embodiment of the present invention.
Figure 28:
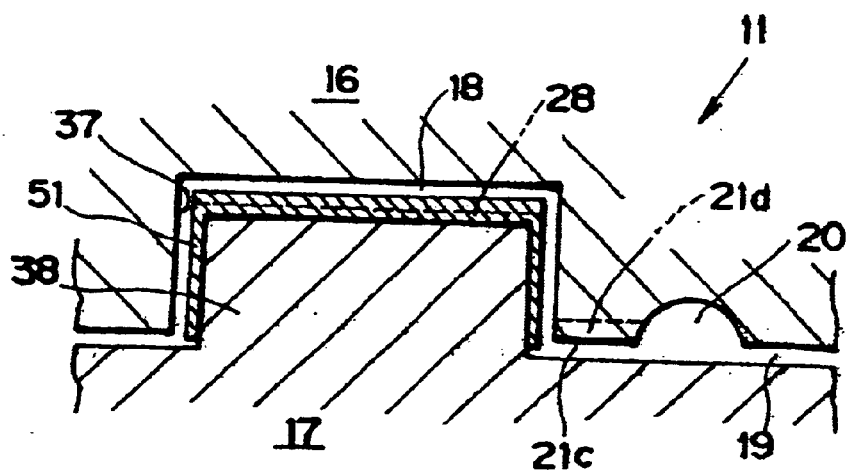
FIG. 28 is a partially enlarged view in section showing a mold for use in molding the molded product according to the seventh embodiment.
Figure 29:
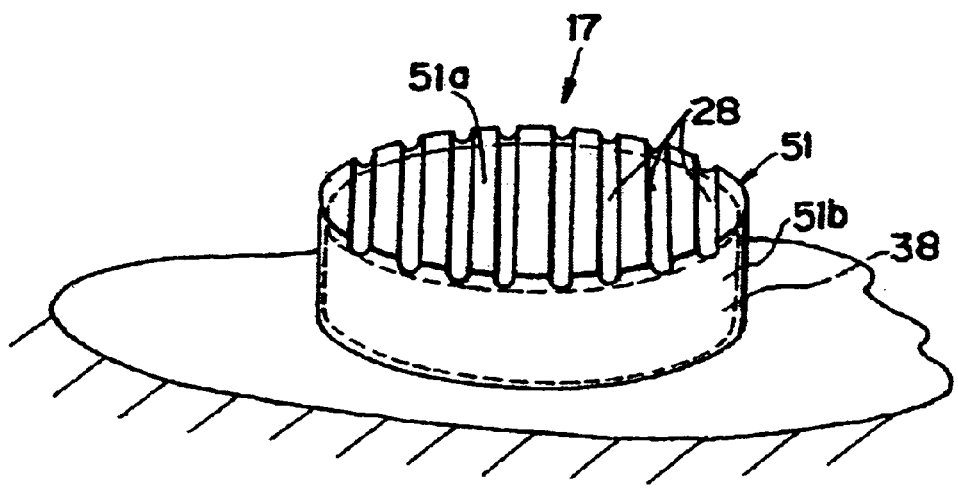
FIG. 29 is a partially enlarged view in section showing a bottom mold section according to the seventh embodiment.
Figure 30:
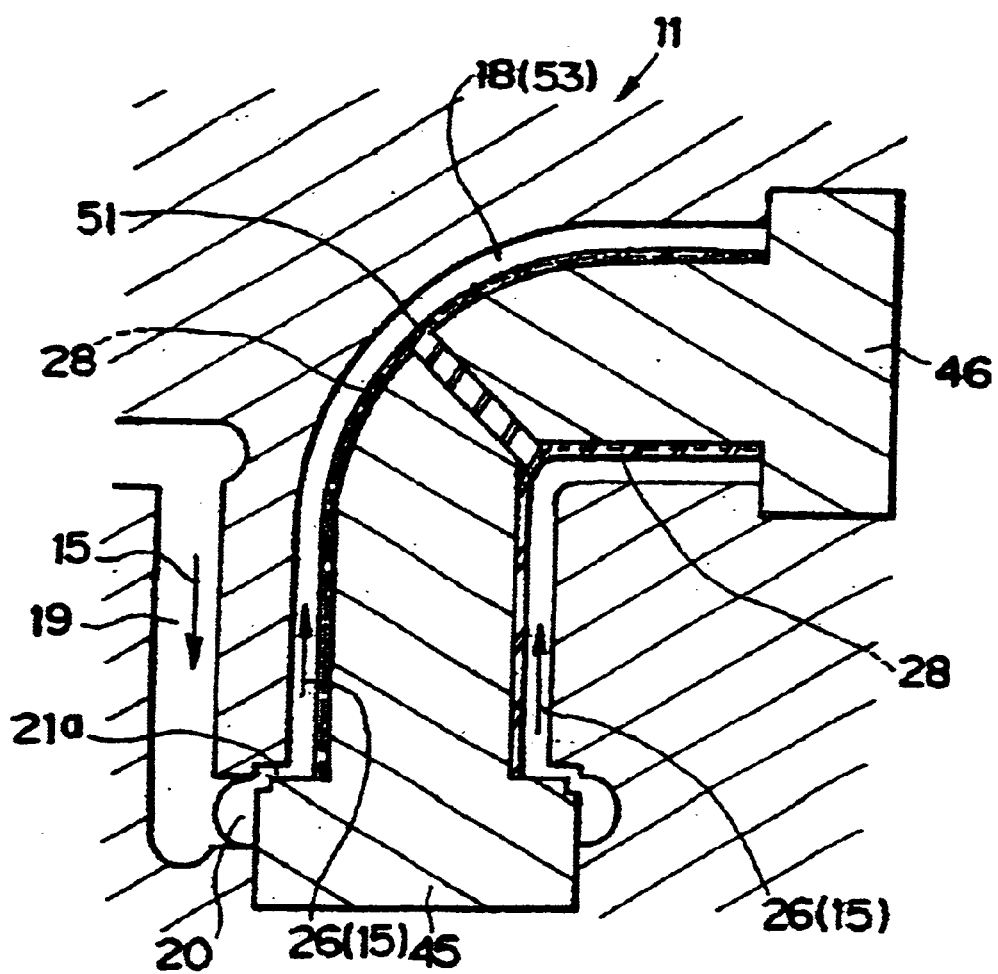
FIG. 30 is a partially enlarged view in section showing a mold for use in accordance with an eighth embodiment of the present invention.
Figure 31:
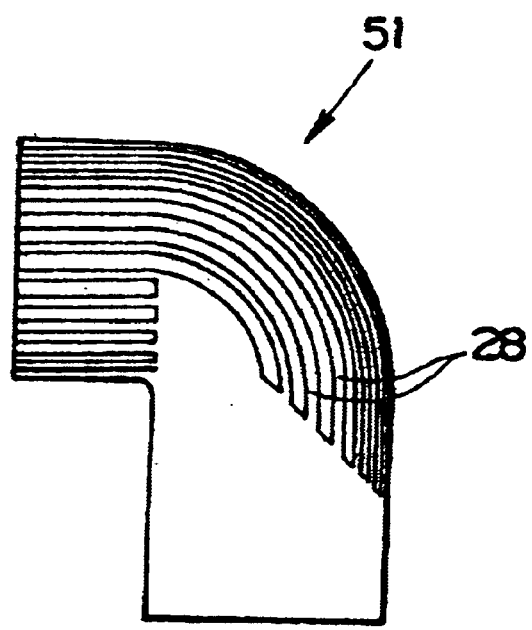
FIG. 31 is a view showing a reinforcement member according to the eighth embodiment.
Figure 32:
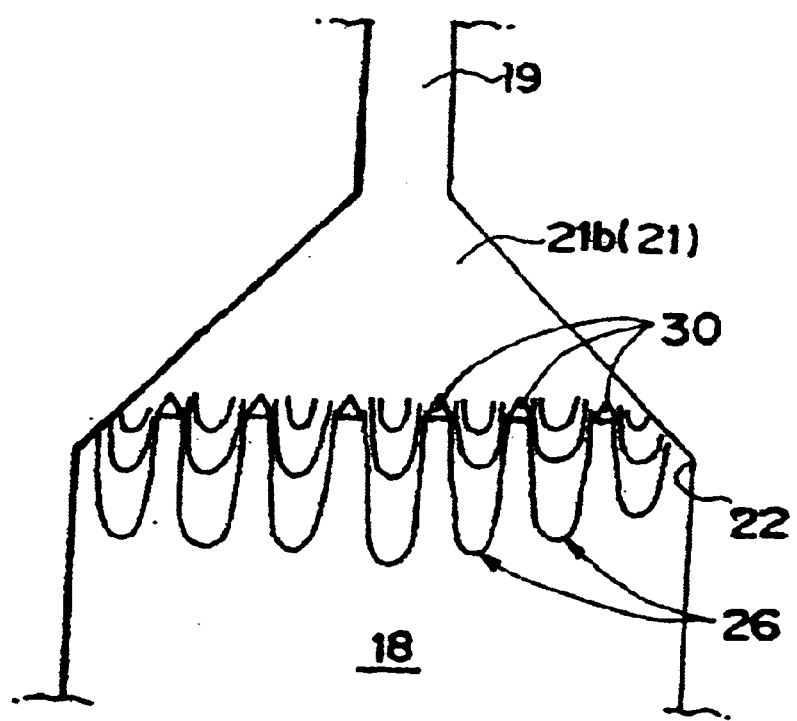
FIG. 32 is a schematic view showing a gate structure according to a ninth embodiment of the present invention.
Figure 33:
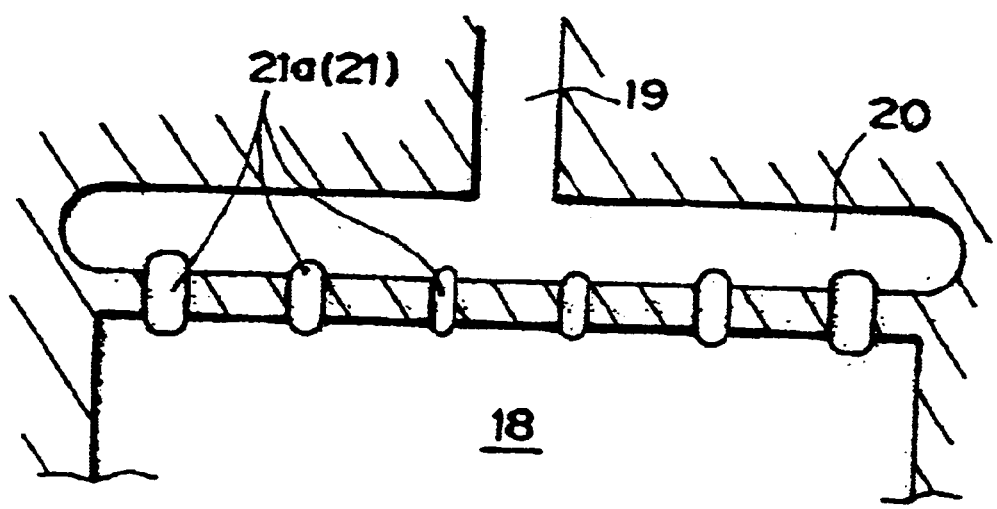
FIG. 33 is a schematic view showing a gate structure according to a tenth embodiment of the present invention.
Figure 34:
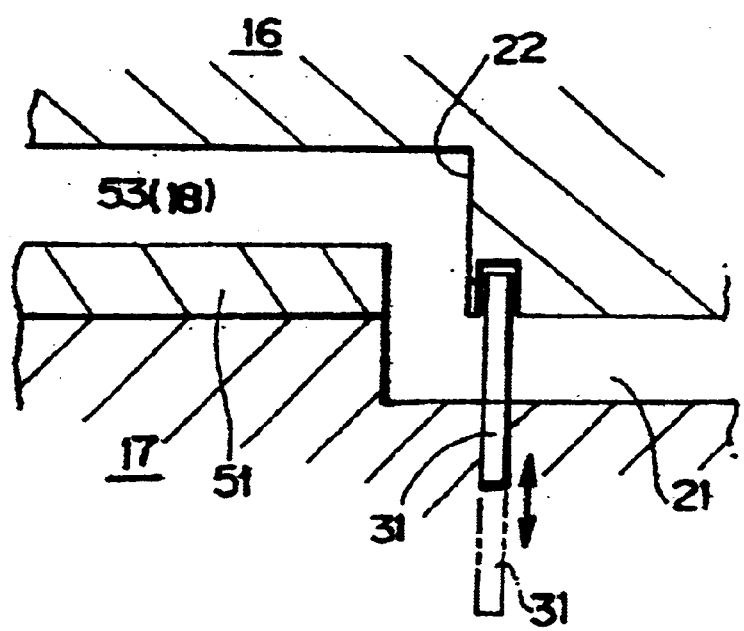
FIG. 34 is a schematic view showing a gate structure according to an eleventh embodiment of the present invention.

FIGS. 9 and 10 show the second embodiment of the present invention; FIGS. 11 to 17 show the third embodiment thereof; FIGS. 18 to 20 show the fourth embodiment thereof; FIGS. 21 to 24 show the fifth embodiment thereof; FIGS. 25 and 26 show the sixth embodiment thereof; FIGS. 27 to 29 show the seventh embodiment thereof; FIGS. 30 and 31 show the eighth embodiment thereof; FIG. 32 shows the ninth embodiment thereof; FIG. 33 shows the tenth embodiment thereof; and FIG. 34 shows the eleventh embodiment thereof. In each of the above embodiments, the elements and parts are provided with the same reference numerals and symbols as in the first embodiment of the present invention.

In the second embodiment as shown in FIGS. 9 and 10, the product part 2 (a molded product) is provided with a plurality of raised parts 27 on the inside as shown in FIG. 9. The plural raised parts 27 are disposed at a spaced relationship apart at given intervals (of each divided stream) in the widthwise direction of the product part 2 and extend in the direction in which the product part 2 extends.

In order to form the plural raised parts 27 on the product part 2, the bottom mold section 17 of the mold is provided with a plurality of guide grooves 28, as shown in FIG. 10. The plural guide grooves 28 extend sideways, and filling each of the guide grooves 28 with the molten resin material 15 forms the raised parts 27 on the product part 2.

Therefore, in the second embodiment, each of the guide grooves 28 functions as a guide means for guiding the molten resin material 15 upon the molding of the product part 2. Each of the divided streams 26 flows appropriately with directional properties and causes no disturbing the directional properties on the basis of the guide function of the guide grooves 28. In addition, this structure can enhance the directional properties of each divided stream 26, so that an ordered and generally straight arrangement of the divided streams 26 can be sustained on the basis of the enhanced directional properties of each divided stream 26 because each divided stream can resist the force of disturbing the directional properties of each of the divided streams 26 even if the force would act upon the divided stream 26. This ensures the sure utilization of the flow characteristics of each divided stream 26, allowing the divided stream 26 of the second material to solidify so as to form the solidification layer section 8 of the second material having a generally constant width and leaving the traces of the divided streams 26 of the second material as a linear pattern on the surface of the product part 2.

FIGS. 11 to 17 shows the third embodiment of the present invention, wherein a fine grain-like pattern is formed on a cap member 34 (the product part 2) in the form of a cylindrical body with bottom, the cap member 34 consisting of a ceiling section 32 and a peripheral wall part 33 extending at a right angle from the peripheral edge portion thereof.

Figure 11:
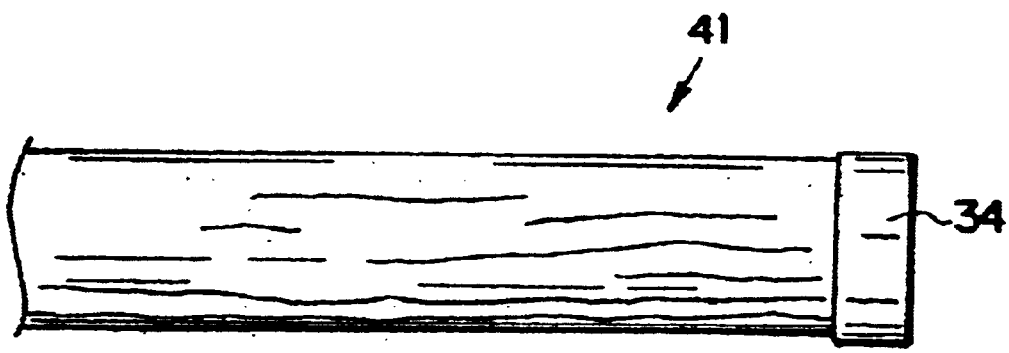
FIG. 11 is a perspective view showing a handrail using a molded product (a cap member) according to a third embodiment of the present invention.
Figure 12:
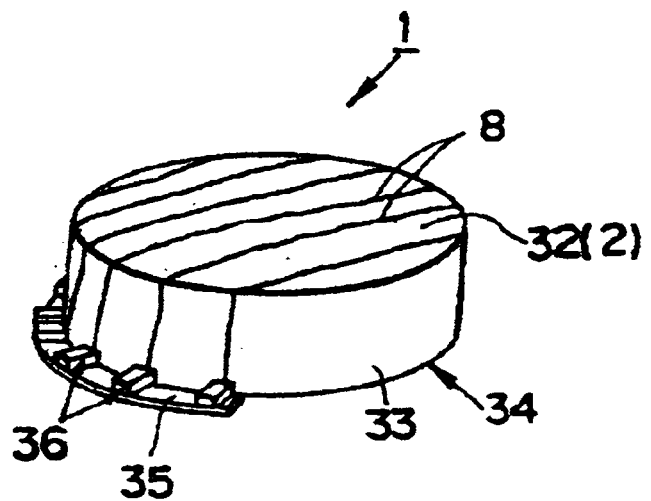
FIG. 12 is a perspective view showing the molded product according to the third embodiment.

In the third embodiment of the present invention as specifically shown in FIG. 12, the molded product 1 comprises the product part 2, a film gate section 35, a plurality of side gate sections 36 disposed sideways, and so on. The film gate section 35 and the plural side gate sections 36 are formed on a one side of the peripheral edge portion of an opening of the cap member 34, the film gate section 35 extending from the divided streams 26 of the first material and the plural side gate sections 36 extending from the corresponding divided streams 26 of the second material. Each of the side gates section 36 is disposed on the film gate section 35. The film gate section 35, the plural side gates section 36 and the burrs are removed after molding, and the cap member 34 as the product part 2 can be used as an cap for closure of an end of a handrail 41, as shown in FIG. 11.

Figure 13:
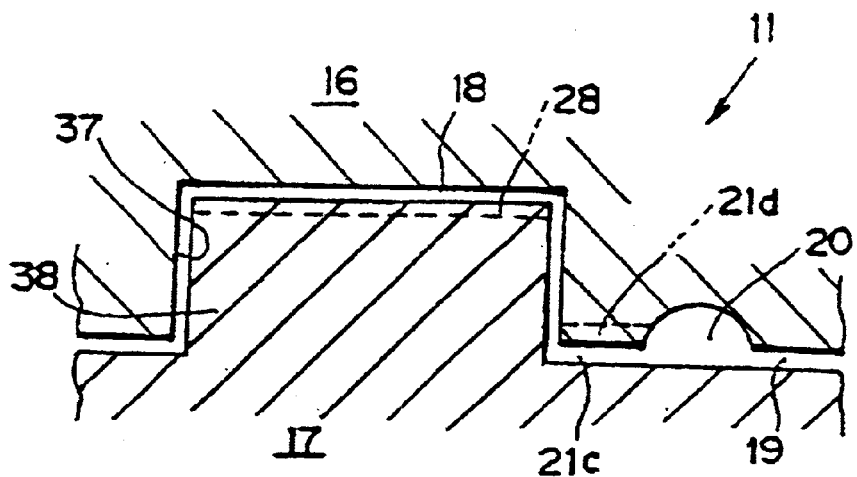
FIG. 13 is a partially enlarged view in section showing a mold for use in molding the molded product according to the third embodiment.
Figure 14:
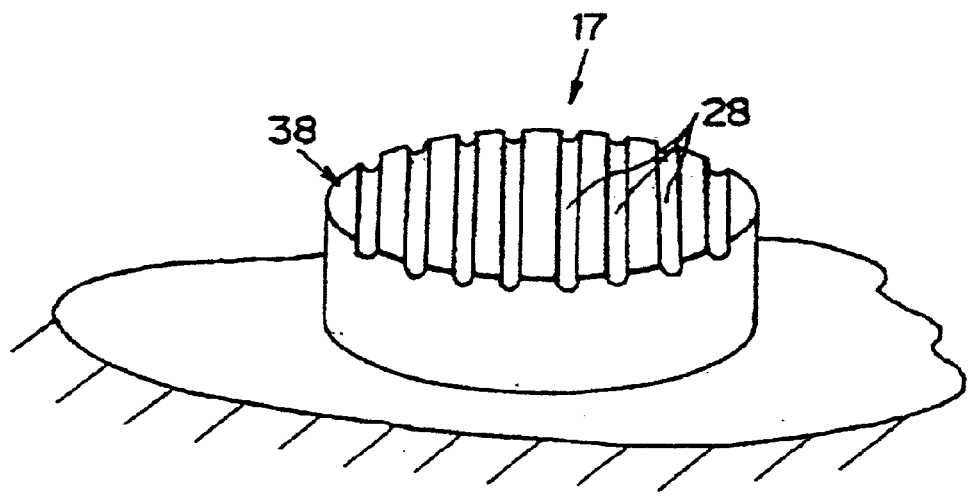
FIG. 14 is a partially enlarged perspective view showing a bottom mold section for use in connection with the third embodiment.

In order to mold the product 1 having the structure as described above, as shown in FIG. 13, the top mold section 16 is provided with a depressed portion 37 while the bottom mold section 17 is provided with a raised portion 36 engageable with the depressed portion 37 of the top mold section 16 so as to form the cavity 18 in the form of the cylindrical body with bottom. Further, the top mold section 16 and the bottom mold section 17 are provide with a film gate 21c and a plurality of side gates 21d corresponding to the film gate section 35 and the plural side gates section 36, respectively, so as to communicate with the cavity 18. In addition, the bottom mold section 17 has the top surface of the raised part 38 provided with a plurality of the guide grooves 28 disposed along and parallel to the direction extending radially from a one side toward the opposite side thereof, as shown in FIGS. 13 and 14.

Figure 15:
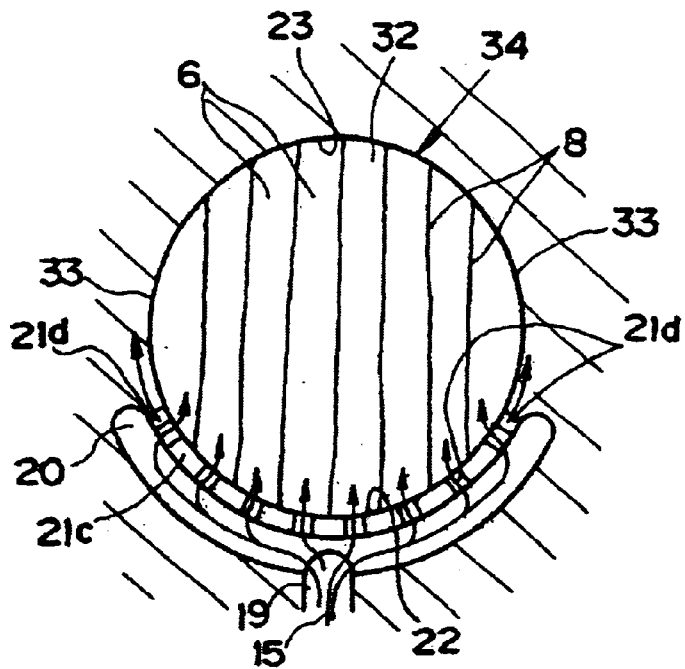
FIG. 15 is a schematic view describing a planar flow of the molten resin in the mold on the plane according to the third embodiment.

When the molten resin is molded with the mold 11 into the product as described above, a plurality of the divided streams 26 are formed by means of the side gates 21d as shown in FIG. 15 and create the action and the function as described above for each divided stream 26. Furthermore, the guide grooves 28 can appropriately flow each of the divided streams 26 with directional properties and suppress the disturbance of the directional properties on the basis of the guide function thereof, even if the product 1 as illustrated in this embodiment would have passages having different distances from the cavity resin feed end 22 of the cavity to the cavity resin reach end 23 thereof, that is, more specifically, even if the distance extending radially from the peripheral wall part portion on the one side via the ceiling portion 32 to the peripheral wall part portion on the other side is different from the distance extending along the direction parallel to the radial direction from the peripheral wall part on the one side via the peripheral wall part 33 to the peripheral wall part on the other side. Furthermore, even if the force that may disturb the directional properties of each divided stream 26 would act onto the divided stream 26, each divided stream can resist the force on the basis of the enhanced directional properties of each divided stream 26 and an ordered arrangement of the divided streams 26 can be sustained, thereby surely forming, on the ceiling part 32 of the cap member 34, a linear pattern composed of the divided stream traces 6 each having a generally constant width of the second solidification layer section 8 of the second material.

At this time, even if the plurality of the divided streams 26 formed by the plural side gates 21d would differ in the force of flow with each other on the basis of the fact that the plural side gates 21 are superimposed on the film gates 21c, the molten resin 15 from the film gates 21c can be adjusted so as to create a balanced flow of each divided stream 26.

Figure 16:
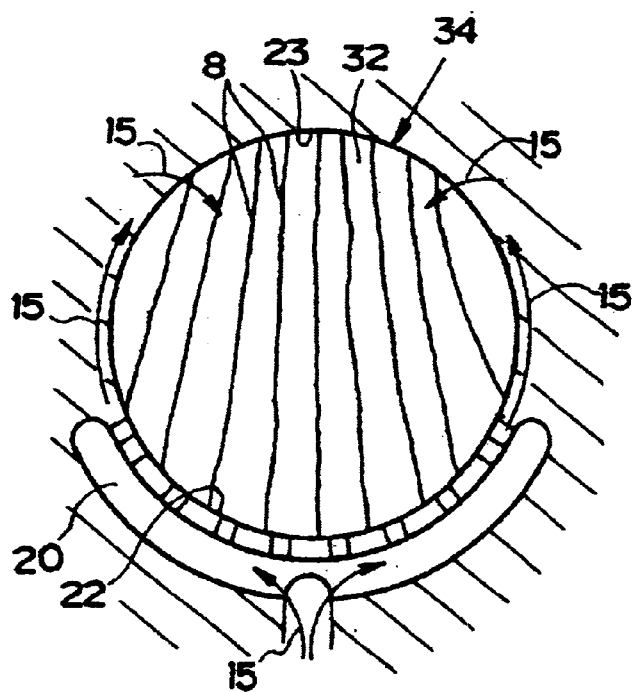
FIG. 16 is a schematic view describing a planar flow of the molten resin in the mold in the case where no guide grooves are formed at the raised portion of the bottom mold section according to the third embodiment.

On the other hand, if no plural guide grooves 28 are formed on the raised parts 38 of the bottom mold 17, a plurality of the second solidification layer section 8 in a linear arrangement can be formed (as a grain-like pattern) on the basis of a plurality of the divided streams 26, as shown in FIG. 16. However, the intervals between the adjacent second solidification layer sections 8 become narrower as the second solidification layer sections 8 come closer to the cavity resin reach end 23 of the cavity. This is considered to occur because, as the molten resin 15 flows from the cavity resin feed end 22 to the cavity resin reach end 23, the molten resin flowing via the portion corresponding to the peripheral wall part reaches the cavity resin reach end 23 earlier than the molten resin 15 that reaches the cavity resin reach end 23 via the portion corresponding to the ceiling portion, so that the force of the molten resin reached earlier acts from the side onto the molten resin 15 flowing via the portion corresponding to the ceiling portion. Conversely, when the raised portion 38 of the bottom mold 17 is provided with the plural guide grooves 28, the divided streams 26 can resist this force to a sufficient extent.

Figure 17:
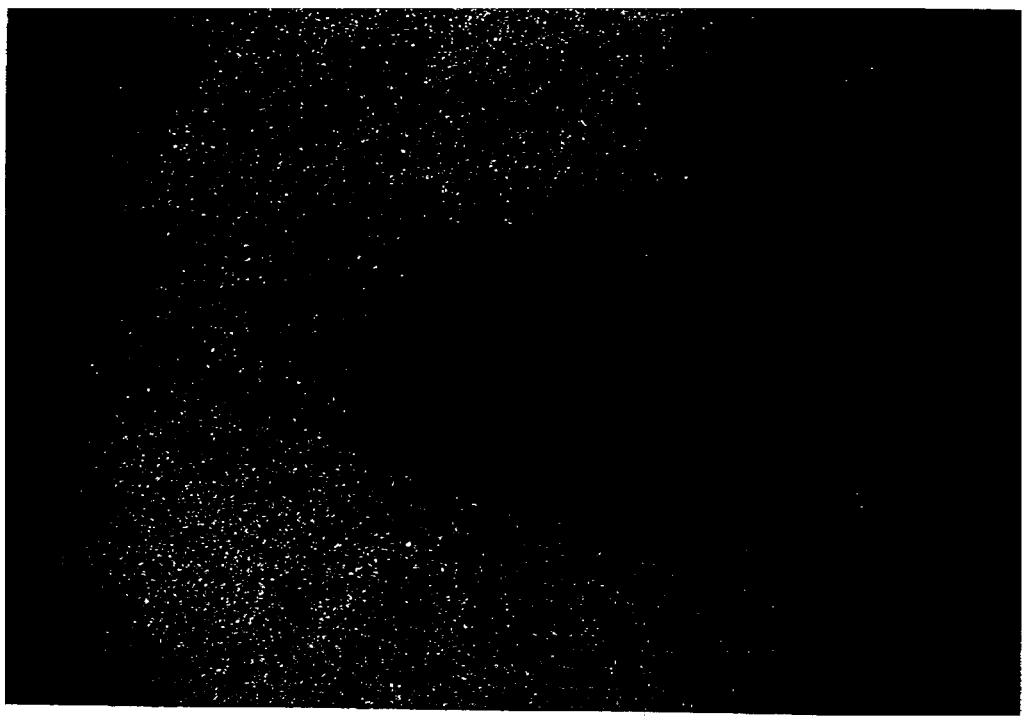
FIG. 17 is a photograph representing the surface of a product portion (a cap member) according to the third embodiment.

FIG. 17 is a photograph showing the surface area of the cap member 34. This photograph indicates a fine grain-like pattern extending from the start end (the cavity resin feed end) to the finish end (the cavity resin reach end) on the surface of the ceiling portion 32 of the cap member 34.

The cap member 32 was formed under the following molding conditions:

1. Size (diameter, 34 mm; height, 10 mm; thickness, 1 mm);
2. Gates (Number, 8; kind, equal-size multi-point overlap gate+film gate);
3. Resin (first material, ABS; second material, PBT);
4. Injection conditions (cylinder temperature, 235°; mold temperature, 60°; maximum injection pressure, 1,500 kg/cm$^2$); and
5. Others (mold fastening force, 150 tons; screw size of an injection molding machine, 46 mm).

It is further to be noted as a matter of course that the space in the thickness of the portion corresponding to the peripheral wall part (in the thickness of the cavity space) can be set so as to become narrower as the distance of the divided stream 26 is shorter, while no guide grooves 28 are disposed or while the guide grooves 28 are disposed. This arrangement of the cavity space can raise the resistance to flow of the divided streams 26 and as a consequence render the timing of the molten resin 15 reaching the cavity resin reach end 23 equal to each other, whichever passages through which the divided streams 26 travel.

In the fourth embodiment of the present invention as shown in FIGS. 18 to 20, a generally L-shaped curved cylindrical body 39 (in the form of an elbow) as a product portion 2 is obtained, which is provided with a fine grain-like pattern extending straight along the axis of the cylindrical body 39 over the entire surface area thereof.

More specifically, as shown in FIG. 19, the molded product 1 before further processing after molding is still provided with a gate section 42 and a runner section 43, in addition to a product part 2 corresponding to the curved cylindrical body 39. The curved cylindrical body 39 is produced in such a way that a plurality of the second solidification layer sections 8 are formed at given intervals in the direction around the periphery thereof and each of the second solidification layer sections 8 extends from one end to the other end along the axis of the curved cylindrical body 39. As shown in FIG. 18, the curved cylindrical body 39 as a product can be used as an edge portion for a handrail 41 after the gate section 42, the runner section 43 and other unnecessary burrs have been removed.

The molded product 1 can be produced using a mold 11 that is provided with a space for forming a generally L-shaped curved cylindrical body (a cavity 18) by using cores 45 and 46 as mold elements, as shown in FIG. 20, and that has a plurality of overlap gates 21a disposed over the entire periphery at a one side end of the cavity (the cavity resin feed end 22).

For the curved cylindrical body 39, it is to be noted herein that the inner peripheral side portion thereof is longer than the outer peripheral side portion thereof so that the plural divided streams 26 formed in the cavity 18 are likely to cause turbulence due to the difference in length among the inner and outer side portions thereof. Accordingly, in this embodiment, a plurality of the guide grooves 28 are formed in the outer peripheral surfaces of the cores 45 and 46 in order to suppress the turbulence of each divided stream 26.

This arrangement can provide a fine grain-like pattern on the basis of the plural divided streams 26, as shown in FIG. 19, even on a curved body member such as the generally L-shaped curved cylindrical body 39 as a molded product, by forming the second solidification layer section 8 (as a linear pattern) for each divided stream 6.

In this case, as an alternative embodiment of the present invention, the cores 45 and 46 may be provided with the guide grooves 28 that may be rendered longer or deeper at the portion (on the outer peripheral side) where the flow distance of the divided stream 26 is longer. In another alternative embodiment, the thickness space of the cavity 18 may be rendered gradually thicker, in place of the guide groove, at the portion where the flow distance of the divided stream 26 becomes longer. This arrangement can achieve the action and effects as can be achieved in the fourth embodiment of the present invention.

The fifth embodiment of the present invention as shown in FIGS. 21 to 24 is directed to a variation of the first embodiment thereof, in which a product part (a molded product) 2 in the form of a flat plate comprises a reinforcement member 51 with a reinforcement function and a solidification layer 52 superimposed on the reinforcement member 51.

In the fifth embodiment, the reinforcement member 51 may be in the form of an elongated flat plate having a constant thickness and be made out of a synthetic resin that may be used also for the solidification layer 52 or be adaptable to such a synthetic resin.

In this embodiment, the solidification layer 52 is in a solid state in which the molten resin covers the reinforcement member 51, and the solidification layer 52 is formed with a plurality of traces 6 of the divided streams 26 composed mainly of the first material of the molten resin upon forming the molten resin so as to cover the reinforcement member.

As the molten resin that forms the solidification layer 52, there may be used a mixture of the first material with the second material as in the first embodiment of the present invention, and the first material has a color different from that of the second material. In the stage of molding, the mixture may be used in such a state that the first material is not blended with the second material in a complete way, that is, the mixture may be used in an incompletely blended state or in a substantially separate manner so as to visibly distinguish the colors of the first and second materials from each other. Specific illustrations of the first and second materials are the same as described for the first embodiment of the present invention.

Figure 21:
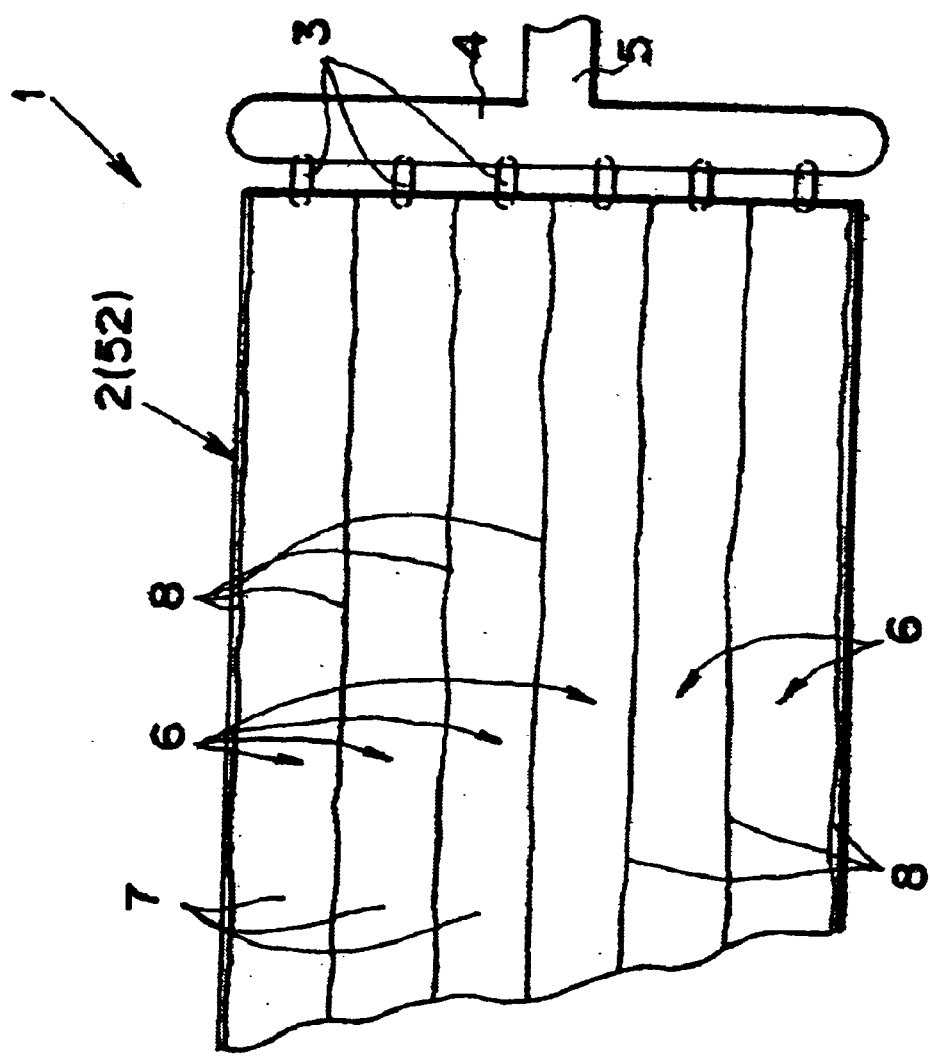
FIG. 21 is a plan view showing the molded product before further processing after molding in accordance with a fifth embodiment of the present invention.
Figure 22:
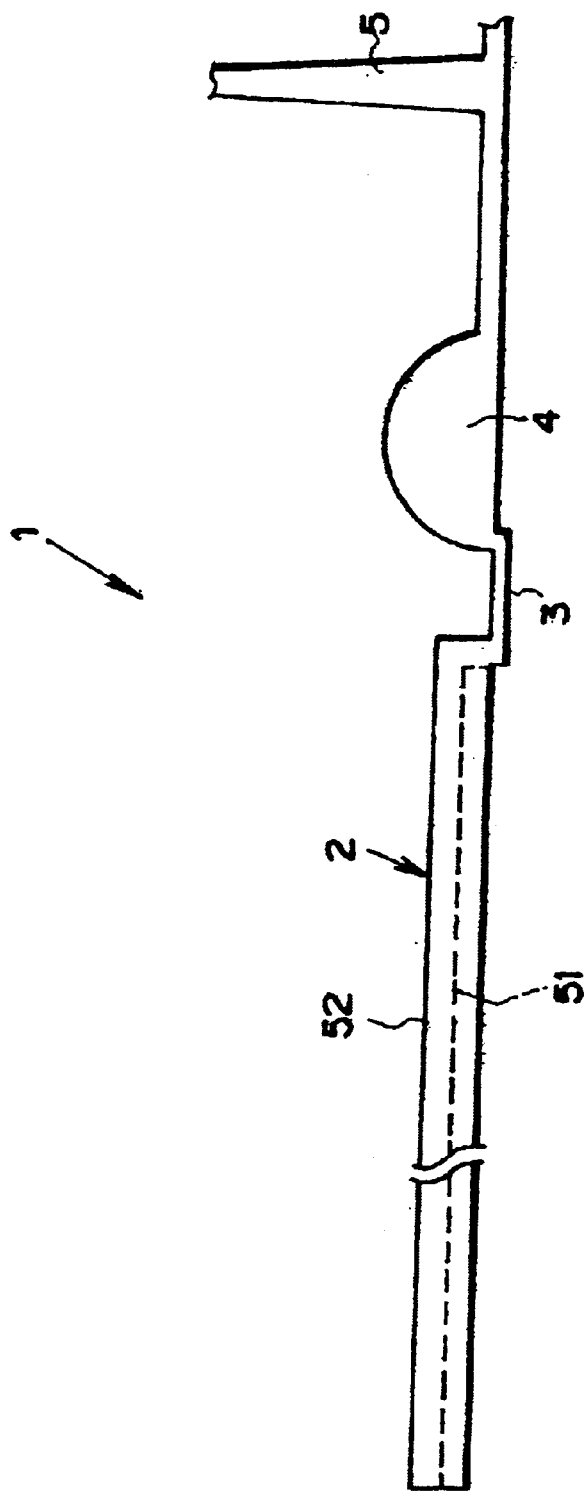
FIG. 22 is an enlarged side view of FIG. 21.

Each of the plural traces 6 of the divided streams 26 has a generally constant width, and it is formed continually in the widthwise direction of the solidification layer 52 (in the up-and-down direction in FIG. 21), and it is arranged so as to extend in the direction of elongation of the solidification layer 52 (in the left-and-right direction in FIG. 21). Each trace 6 of the divided stream comprises the first solidification layer section 7 and the second solidification layer section 8 as in the first embodiment of the present invention, and the first and second solidification layers 7 and 8 are also formed inside the solidification layer 52 as well as on the surface thereof.

Figure 23:
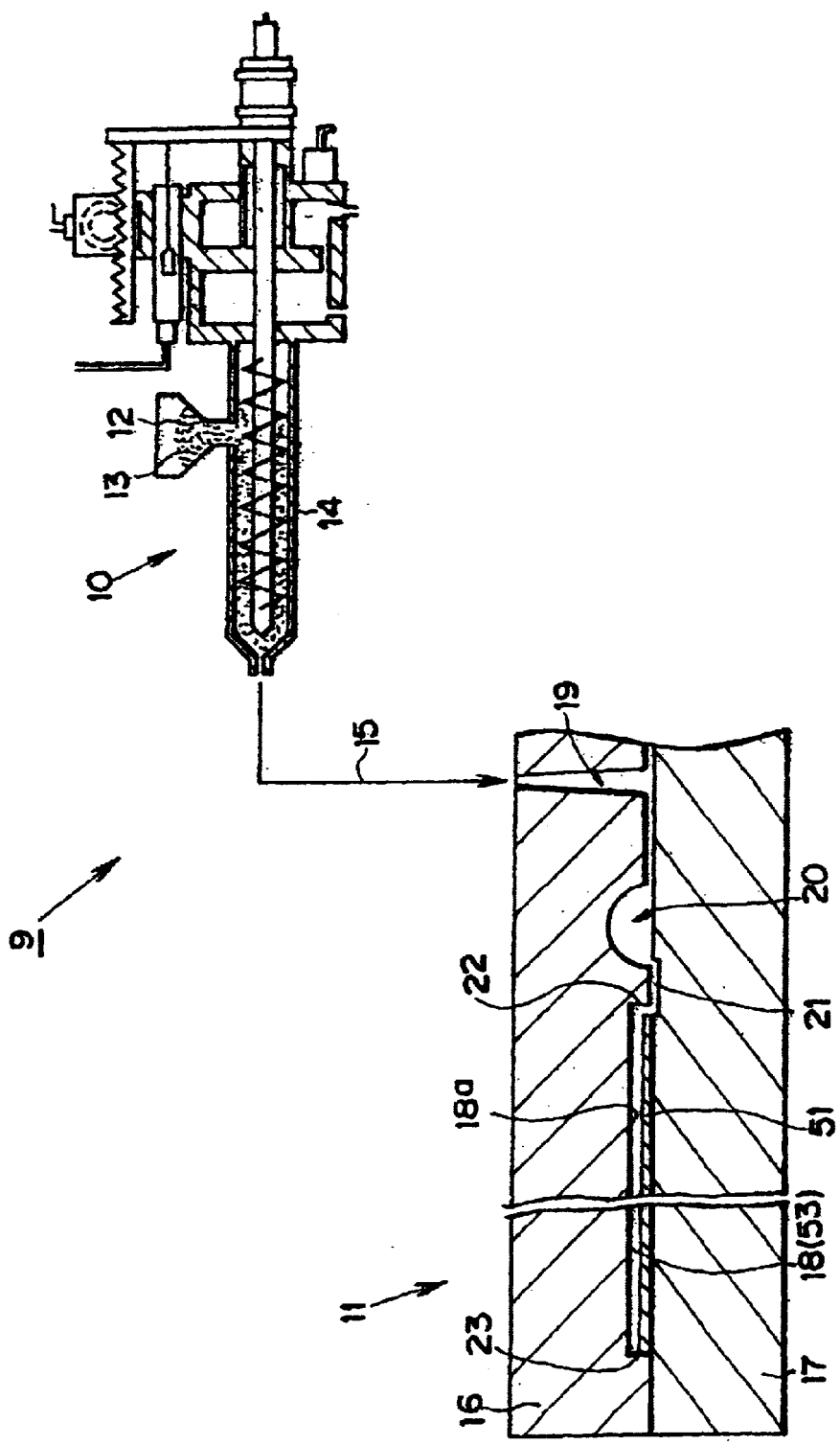
FIG. 23 is a schematic view describing a device for the preparation of the injection molded product according to the fifth embodiment.

A manufacturing device 9 for manufacturing the molded product 1 according to the fifth embodiment of the present invention has a molding machine 10 and a mold 11, as shown in FIG. 23.

The molding machine 10 may be the same as that described in connection with the first embodiment of the present invention, and the molten resin 15 can be fed from the molding machine 10 toward the mold 11 at a constant pressure (a constant injection pressure). In this case, the first material may be blended with the second material in a substantially separate state, for example, by adjusting the temperature of the cylinder 14 or by other means upon the formation of the molten resin 15.

Figure 24:
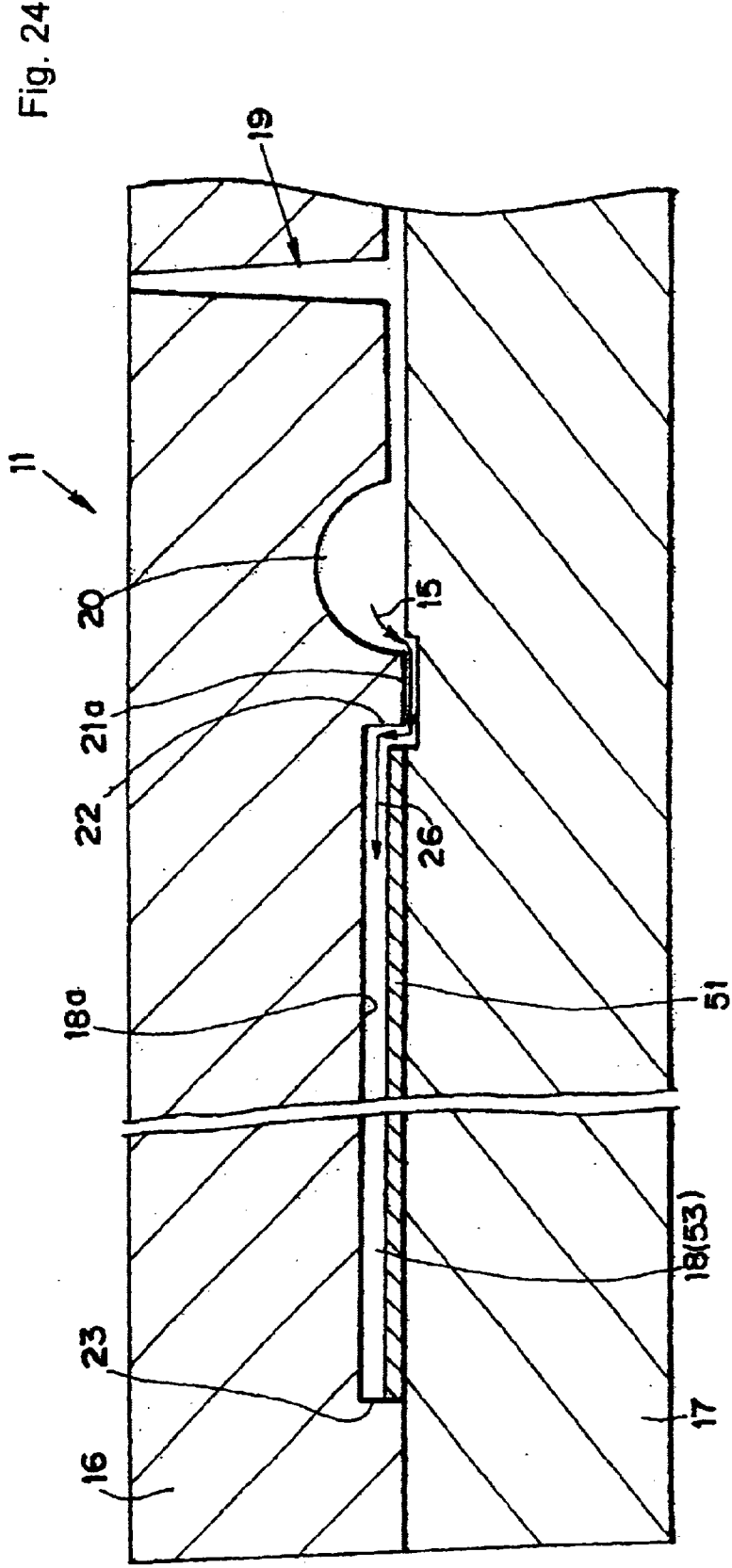
FIG. 24 is a partially enlarged view in section showing a mold for use in accordance with the fifth embodiment.

As shown in FIGS. 23 and 24, the mold 11 may be the same as that used in the first embodiment of the present invention, and the reinforcement member 51 may be disposed in the cavity 18 that is formed at the time of fastening the mold sections. A space 53 (part of the cavity 18) having a constant thickness, which may be filled with the molten resin, is formed between the reinforcement member 51 and a wall surface 18a of the cavity 18, and the cavity resin feed end 22 of the cavity and the cavity resin reach end 23 thereof are disposed at the space 53 with the molten resin filled therein. From the cavity resin feed end 22 of the cavity 18, the molten resin 15 is fed as a plurality of the divided streams 26 through the plural gates 21 into the space 53.

Therefore, the above manufacturing device 9 can provide a flow pattern on the basis of the action as in the first embodiment of the present invention, the pattern having a generally constant width for each divided stream 6, whether the full length of the divided stream would be relatively shorter or longer, and the molded product 1 (the product part 2) having a clear and fine grain-like pattern (formed by the second solidification layer sections 8) can be obtained, which is very likely to resemble a natural grain and which can achieve the action and effects as accomplished by the first embodiment of this invention. In this case, a fine grain-like pattern can be formed over the entire area from the start end (the cavity resin feed end side) to the finish end (the cavity resin reach end side) on the surfaces of the solidification layers 52, as in the first embodiment of this invention as shown in FIG. 8.

Further, in the fifth embodiment of the present invention, a desired and sufficient amount of strength can be ensured by the existence of the reinforcement member 51 with the solidification layer 52, and a fine grain-like pattern clearly appears on the surface of the product on the basis of each trace 6 of the divided streams 26 by rendering the solidification layer 52 thinner as the divided streams are elongated longer. In this embodiment, the first material 24 and the second material 25 of the molten resin, which are different in color, are allowed to solidify in an incompletely blended manner. Therefore, this embodiment can ensure a sufficient degree of strength as a molded product by the reinforcement member 51 that can avoid a decrease in the strength, even if the strength of the solidification layer 52 would be decreased to some extent as compared with the case in which they are well blended.

The sixth embodiment as shown in FIGS. 25 and 26 is directed to a variation in the fifth embodiment of the present invention. In the sixth embodiment the reinforcement member 51 is provided with the plural guide grooves 28 on the surface opposite to the solidification layer 52. The solidification layer 52 extends into each of the guide grooves 28, forming a plurality of the raised section 27 on the inner surface of the solidification layer 52. In this case, the guide grooves 28 of the reinforcement member 51 are formed so as for their groove width to become wider as the guide grooves 28 become deeper. This arrangement can integrate the solidification layer 52 (the raised section 27) with the reinforcement member 51 (the guide grooves 28) with a more tight strength.

As shown in FIG. 26, the product part 2 can be formed by setting the reinforcement member 51 with the plural guide grooves 28 disposed sideways in the cavity 18 and feeding the molten resin 15 as a plurality of the divided streams 26 to the cavity 18 with the reinforcement member 51 set therein.

Therefore, in the sixth embodiment of the present invention, each of the guide grooves 28 can function as guide means for guiding the molten resin 15 upon the molding of the product part 2, and this guide function can control each divided stream 26 flowing appropriately with directional properties and avoid a admixture or turbulence of the divided streams 26. Furthermore, even if the force of disturbing the directional properties of each divided stream would act upon the divided stream, each of the divided streams 26 can resist the force on the basis of the enhanced directional properties of the divided stream 26, thereby sustaining an ordered and generally straight arrangement of the divided streams 26. Therefore, the product part 2 in the form of an elongated flat plate can be provided with the second solidification layer sections 8 (a linear pattern) having a generally constant width for each trace 6 of the divided streams after solidification by utilizing the action of each divided stream 26.

Further, although the solidification layer 52 is provided with raised and depressed portions on the inside thereof by the guide grooves 28, the thickness of the product part 2 can be rendered constant and the inside surface of the product part 2 can be rendered flat by the adjustment action of the reinforcement member 52 in a superimposed state (by adjustment of the thickness or adjustment of the inner surface by the reinforcement member), thereby achieving improvements in operability and look, etc.

Moreover, the guide grooves 28 can increase the area of attachment of the reinforcement member 51 to the solidification layer 52, thereby rendering the strength of attachment between the two elements 51 and 52 extremely high.

In the seventh embodiment of the present invention as shown in FIGS. 27 to 29, it is shown a cylindrical cap member 34 (as the product part 2) with bottom, which has the reinforcement member 51 and is provided with a fine grain-like pattern.

The cap member 34 is in the form of an inside-outside double structure comprising a cylindrical reinforcement member 51 with bottom and a solidification layer 52 integrally covering the reinforcement member 51, the reinforcement member consisting of a ceiling part 51a and a peripheral wall part 51b extending at a right angle from the ceiling part 51a, and the solidification layer 52 consisting of a ceiling part 52a and a peripheral wall part 52b. The molded product 1 comprises the product part 2, the solidification layer 52, the film gate section 35, a plurality of the side gates 36 disposed sideways, and so on (FIG. 27 showing a flow status of the molten resin 15 immediately after the start of injection, and being utilized for description of each element for brevity of explanation). The film gate section 35 and the plural side gate sections 36 are disposed on the peripheral wall part 52b at a one peripheral edge portion of an opening of the cap member. On the other hand, the plural side gate sections 36 are disposed on the film gate section 35. The plural side gate sections 36 and the film gate section 35 are then removed after molding to produce the cap member 34 as the product portion 2. The cap member 34 can be used as a cap for enclosure of an edge portion of a handrail 41 as in the third embodiment of the present invention as shown in FIG. 11.

As shown in FIG. 28, the mold 11 for use in molding the above molded product 1 comprises a top mold section 16 with a depressed portion 37 and a bottom mold section 17 with a raised portion 38. The top and bottom mold sections 16 and 17 forms a cavity 18 in the form of a cylindrical body with bottom, in combination with the depressed portion 37 of the top mold section 16 with the raised portion 38 of the bottom mold section 17, when the mold 11 is fastened together. The mold 11 is arranged such that the film gate 21c and the plural side gates 21d are disposed at the cavity 18 in the manner that corresponds to the film gate section 35 and the plural side gate sections 36, respectively. The mold 11 has a reinforcement member 51 in the form of a cylindrical body with bottom set in advance within the cavity 18 so as to engage with the depressed portion 38 of the bottom mold section 17, as shown in FIG. 28. With this arrangement, a space (the cavity 18) having a constant length for filling the molten resin therein can be formed between the reinforcement member 51 and the cavity wall surface 18a of the cavity 18. The ceiling section 51a of the reinforcement member 51 is provided with a plurality of guide grooves 28 extending from the one end to the opposite end and parallel to each other, as shown in FIGS. 27 to 29.

When the molding is effected with the mold 11 as described above, a plurality of the divided streams 26 are formed by means of the side gates 21d as in the third embodiment of the present invention as shown in FIG. 15, thereby creating the action for each divided stream 26 in the manner as described above. In addition, even if the distance extending from the cavity resin feed end 22 to the cavity resin reach end of the cavity would be different among the portions of a molded product such as the one indicated by reference numeral 1, that is, even if the distance extending from the one side of the peripheral wall part to the opposite side thereof via the ceiling part 51a is different from the distance extending from the one side of the peripheral wall part to the opposite side thereof via the peripheral wall part 51b, each of the divided streams 26 can be controlled by the guide function of the plural guide grooves 28 so as to flow appropriately with directional properties without the appropriate directional properties of each divided stream being disturbed. Moreover, even if the force that may disturb the directional properties of each divided stream 26 would act upon each divided stream 26, each divided stream can resist the force on the basis of the enhanced directional properties of the divided streams 26, so that the divided streams 26 can sustain an ordered arrangement of the divided streams 26. Therefore, a linear pattern can be formed even on the surface of the ceiling part 52a of the molded product such as the cap member 34 on the basis of the second solidification layer sections 8, having a generally constant width for each trace 6 of the divided streams 26.

It can be noted at this time, as a matter of course, that the plurality of the divided streams 26 to be formed by the plural side gates 21d can be adjusted by the molten resin flowing from the film gate 21c on the basis of the interposition of the plural side gates 21d between the film gate 21c, although there is a difference in magnitude. Therefore, each divided stream 26 is balanced well in the same manner as shown in FIG. 15.

On the other hand, in the case where no plural guide grooves 28 are formed on the ceiling part 51a of the reinforcement member 51, a plurality of the linear solidification layer sections 8 (a fine grain-like pattern) of the second material can be formed on the basis of the plural divided streams 26 in substantially the same manner as in the third embodiment, as shown in FIG. 16, and the intervals of the second solidification layer sections 8 become narrower as the solidification layer sections 8 come closer to the cavity resin reach end 23 of the cavity. In contrast, when the plural guide grooves 28 are provided on the ceiling part 51a of the reinforcement member 51, the plural linear solidification layer sections 8 of the second material can be sustained up to the cavity resin reach end 23 thereof without the intervals between the second solidification layer sections being narrowed.

In the eighth embodiment of the present invention as shown in FIGS. 30 and 31, the product portion 2 in the form of a generally L-shaped (an elbow-like shaped) curved cylindrical body 39 (2) with the reinforcement member 51 disposed thereon is provided with a fine grain-like pattern extending along and parallel to the axis of the curved cylindrical body 39 on the entire peripheral area thereof.

The curved cylindrical body 39 is in the form of an inside-outside double structure comprised of a generally L-shaped reinforcement member 51 (as shown in FIG. 30) and a generally L-shaped solidification layer 52 disposed so as to integrally cover the outside of the reinforcement member 51. The molded product 1 has the curved cylindrical body 39 as the product portion 2, the gate section 42, and the runner section 43 before it is processed after molding. The curved cylindrical body 39 is provided with a fine grain-like pattern on the peripheral surface thereof along the axial direction, which is made of the plural solidification layer sections 8 of the second material and extends from the one end to the opposite end. The curved cylindrical body 39 can be used as an edge portion for a handrail 41 in the same manner as in the fourth embodiment as shown in FIG. 18, after the gate section 42 and the runner section 43 have been removed.

The mold 11 for use in molding the molded product 1 as shown in FIG. 31 has the generally L-shaped reinforcement member 51 disposed inside by means of cores 45 and 46 as mold elements, as shown in FIG. 30, so as to form a generally L-shaped space 53 (a cavity 18) with the molten resin filled therein between the reinforcement member 51 and the inner cavity wall surface 18a of the cavity 18. A plurality of overlap gates 21a is formed at the entire periphery on the one side (the cavity resin feed end 22) of the space in which it is filled with the molten resin.

With this arrangement, the distance from the one end to the opposite end of the curved cylindrical body 39 becomes different between the distance at the outer peripheral side portion 39a and the distance at the inner peripheral side portion 39b thereof and the distance on the outer peripheral side portion 39a becomes longer than that on the inner peripheral side portion 39b. A plurality of the divided streams 26 formed within the resin-filling space 53 (the cavity 18) are likely to cause mixing together due to the difference in distance between the outer and inner peripheral side portions. Therefore, as shown in FIGS. 30 and 31, a plurality of guide grooves 28 are formed so as to become longer at the portion at which the flow distance of the divided stream 25 becomes longer, that is, at the outer peripheral side portion of the reinforcement member 51, thereby causing the force of the divided streams 26 flowing on the outer peripheral side portion of the reinforcement member 51 to resist the force of the divided streams 26 flowing on the inner peripheral side portion thereof.

With this arrangement, even the product in the form of the L-shaped curved cylindrical body 39 or the like can be provided with a fine grain-like pattern on the peripheral surface thereof by allowing traces 6 of the divided streams 26 to solidify as the second solidification layer sections 8 in the form of a liner pattern as in the fourth embodiment of the present invention as shown in FIG. 19.

In this case, as an alternative aspect, in order to enhance the guide function, the guide grooves 28 may be formed over the entire length of the reinforcement member 51 or may be formed so as to become deeper as the flow distance of the divided streams 26 becomes longer (on the outer peripheral side portion thereto) so as to render the divided streams 26 more likely to flow. As another alternative aspect, in place of the formation of the guide grooves 28, a space (an interval between the reinforcement member 51 and the inner wall surface of the cavity 18) corresponding to the thickness of the cavity 18 may be formed so as to become thicker by adjusting the disposition of the reinforcement member 51 inside the cavity 18, adjusting the thickness of the reinforcement member 51 or by any other appropriate means, as the flow distance of the divided streams 26 becomes longer. This arrangement can produce the action and effects in substantially the same manner as in the eighth embodiment.

The ninth embodiment of the present invention as shown in FIG. 32 is arranged such that a fan gate 21b is used as the gate 21. The fan gate 21b is provided with a plurality of partitions 30 in front of the cavity resin feed end 22 of the cavity so as to allow the molten resin to pass through the plurality of the partitions 30 forming a plurality of divided streams 26 and feeding them into the cavity 18. The aspect of the ninth embodiment of the present invention can be applied to anyone of the previous first to eighth embodiments of the invention.

In the tenth embodiment of the present invention as shown in FIG. 33, a plurality of gates 21 are arranged in such a manner that the gates are set to have a smaller size as they can feed the divided streams 26 into the cavity 18 at a faster timing than the rest.

More specifically, for instance, the mold 11 for use in the tenth embodiment may be configured in such a manner that hen a spool 19 is located at the transversely central position of the runner 20, the timing of feeding the molten resin into the cavity 18 in the form of divided streams 26 can become nearly equal to one another. In order to enhance the accuracy of the timing of feeding each of the divided streams 26, the gates 21 likely to undergo the dynamic pressure of the molten resin (the gates facing and nearby the outlet of the spool 19) are set to have a smaller aperture size than the rest in order to have a higher pressure to passage of the molten resin. This arrangement can make the timing of feeding each of the divided streams 26 identical to each other, thereby utilizing the action of each divided stream 26 for sure and forming a linear pattern corresponding traces 6 of the second solidification layer sections 8, each having a constant width and interval, on the surface of the product portion 2. This aspect of the tenth embodiment of the present invention can also be applied to any previous first to ninth embodiments.

The eleventh embodiment of the present invention as shown in FIG. 34 is arranged in such a way that an opening valve 31 is disposed in front of the cavity resin feed end 22. The opening valve 31 is opened at the timing at which the portion of the gate 21 in front of the valve 31 is filled with the molten resin 15, and the molten resin 15 is then fed into the cavity 18 in the form of plural divided streams 26. With this arrangement, the timing of feeding each divided stream 26 into the cavity 18 can be rendered equal to one another with high accuracy, thereby utilizing the action of each divided stream 26 for sure. This aspect of the eleventh embodiment of the present invention can also be applied to the previous first to tenth embodiments.

As described above, the present invention has been described by way of examples and it is to be understood that the invention should not be interpreted as being limited to those described above and it should encompass any modifications and variations without departing the scope and spirit of the invention. For instance, the following aspect should be interpreted as being encompassed within the scope of this invention:

1. A plurality of gates are disposed such that their intervals of disposition become smaller so as to provide a fine grain-like pattern having smaller intervals among the grain-like pattern so as to resemble a grain of natural wood.

2. A film gate is also used as an overlap gate.

What is claimed is:

1. A method for the preparation of an injection molded product, comprising:

feeding a molten resin to a runner, which is formed at an upstream side of a cavity resin feed end of a cavity of a mold and extends along the cavity resin feed, the molten resin comprising a first material and a second material having a color different from that of the first material in a substantially separately mixed state; and feeding the molten resin from the runner into the cavity resin feed through a plurality of gates so that the molten resin is fed into the cavity of the mold in a form of a plurality of divided streams of the molten resin, and forming an injection molded product with a straight grain pattern in the cavity.

2. The method for the preparation of the injection molded product as claimed in claim 1, wherein the molten resin is fed at a generally equal timing into the cavity in the form of the plurality of the divided streams.

3. The method for the preparation of the injection molded product as claimed in claim 1, wherein the plurality of the divided streams are formed by means of a plurality of gates disposed along and parallel to the cavity resin feed end of the cavity.

4. The method for the preparation of the injection molded product as claimed in claim 3, wherein a film gate communicating with each of the plurality of the gates is used upon feeding the molten resin into the cavity, in combination with the plurality of the gates, the film gate being disposed adjacent the plurality of the gates.

5. The method for the preparation of the injection molded product as claimed in claim 1, wherein the plurality of the gates are set to have a smaller gate size as the molten resin is fed through the gates to the cavity at a faster timing than the rest.

6. The method for the preparation of the injection molded product as claimed in claim 2, wherein an opening valve is disposed at the cavity resin feed end of the cavity and the opening valve is opened to feed the molten resin into the cavity in the form of each divided stream as the gate in front of the cavity resin feed end thereof is filled with the molten resin.

7. The method for the preparation of the injection molded product as claimed in claim 1, wherein a guide means is disposed so as to guide each divided stream, the guide means comprising a depressed section or a raised section disposed at a site of the cavity corresponding to an inside of a molded product.

8. The method for the preparation of the injection molded product as claimed in claim 1, wherein a resistance to flow of each divided stream located at a site where a relative flow distance of the divided stream is longer is set so as to become smaller than at a site where the relative flow distance thereof is shorter.

9. The method for the preparation of the injection molded product as claimed in claim 8, wherein means to render the resistance to flow of the divided stream smaller is to render a space corresponding to a thickness of the cavity thicker relative thereto in a flow region of the divided stream.

10. The method for the preparation of the injection molded product as claimed in claim 7, wherein the guide means is set to become longer at a site at which the flow distance of the divided stream is longer than at a site at which the flow distance thereof is shorter.

11. The method for the preparation of the injection molded product as claimed in claim 1, wherein:

the plural divided streams are formed by means of a plurality of gates disposed along the cavity resin feed end of the cavity, in combination of a film gate disposed adjacent the plurality of the gates and communicating therewith; and the guide means is disposed so as to guide the plural divided streams at a site of the cavity corresponding to an inner side portion of a molded product.

12. The method for the preparation of the injection molded product as claimed in claim 11, wherein:

the guide means comprises a guide groove for guiding each divided stream disposed at the site of the cavity corresponding to the inner side of the molded product; and the guide groove is disposed so as to become longer at a site at which a flow distance of the divided stream is longer than at a site at which it is shorter.

13. A method for the preparation of an injection molded product, comprising:

feeding a molten resin composed of a mixture of a first material with a second material having a color different from that of the first material into a runner, which is formed at an upstream side of a cavity resin feed end of a cavity of a mold and extends along the cavity resin feed, with a reinforcement member set at a site of the cavity corresponding to an inner side of the injection molded product, the first material and the second material being mixed in a substantially separately mixed state; and feeding the molten resin from the runner into the cavity resin feed through a plurality of gates so that the molten resin in form of a plurality of divided streams is fed from the cavity resin feed end into a cavity resin-filling space formed within the cavity between the reinforcement member and a wall surface of the cavity and forming an injection molded product with a straight grain pattern in the cavity resin-feeding space.

14. The method for the preparation of the injection molded product as claimed in claim 13, wherein an interval between the reinforcement member and the wall surface of the cavity is adjusted by adjusting a manner of disposition of the reinforcement member so as to become larger at a site where a flow distance of each divided stream in a flow direction of the divided stream is longer relatively to at a site where the flow distance thereof is shorter.

15. The method for the preparation of the injection molded product as claimed in claim 13, wherein an interval between the reinforcement member and the wall surface of the cavity is adjusted by adjusting a thickness of the reinforcement member so as to become larger at a site where a flow distance of each divided stream in a flow direction is longer relative to a site where the flow distance thereof is shorter.

16. The method for the preparation of the injection molded product as claimed in claim 13, wherein the reinforcement member is provided with a guide groove for guiding each divided stream so as to be located between the reinforcement member and a wall surface of the cavity.

* * * * *

UNITED STATES PATENT AND TRADEMARK OFFICE
CERTIFICATE OF CORRECTION

PATENT NO. : 6,660,196 B1  Page 1 of 1
DATED : December 9, 2003
INVENTOR(S) : Kenju Iwase et al.

It is certified that error appears in the above-identified patent and that said Letters Patent is hereby corrected as shown below:

<u>Column 36,</u>
Line 7, after "in" insert -- a --.

Signed and Sealed this

Fourth Day of May, 2004

JON W. DUDAS
*Acting Director of the United States Patent and Trademark Office*